US005875035A

United States Patent [19]

Motosugi et al.

[11] Patent Number: 5,875,035

[45] Date of Patent: Feb. 23, 1999

[54] IMAGE PROCESSING DEVICE WITH ORIGINAL IMAGE DETERMINATION MEANS

[75] Inventors: Toshihisa Motosugi, Okazaki; Hiroyuki Ideyama, Toyokawa, both of Japan

[73] Assignee: Minolta Co., Ltd., Osaka, Japan

[21] Appl. No.: 747,832

[22] Filed: Nov. 13, 1996

[30] Foreign Application Priority Data

Nov. 13, 1995 [JP] Japan .................................... 7-294213
Oct. 30, 1996 [JP] Japan .................................... 8-288562

[51] Int. Cl.[6] .............................. H04N 1/387; H04N 1/40

[52] U.S. Cl. .......................... 358/296; 358/452; 358/462; 358/488; 358/527; 382/292; 382/296

[58] Field of Search .................................... 358/296, 400, 358/401, 448–453, 462, 488, 500, 501, 527, 530, 537, 538; 382/162, 167, 216, 254, 290, 292, 293, 296, 297, 309; 395/101, 109, 112

[56] References Cited

U.S. PATENT DOCUMENTS 4,007,362 2/1977 Sindermann ........................ 358/452 X
4,617,596 10/1986 Yoshida et al. ......................... 358/452
4,837,635 6/1989 Santos .
5,077,811 12/1991 Onda .
5,239,388 8/1993 Matsumoto ............................. 358/448
5,301,036 4/1994 Barrett et al. ........................... 358/448
5,557,430 9/1996 Isemura et al. ......................... 358/501
5,649,033 7/1997 Morikawa et al. ..................... 382/297

*Primary Examiner*—Peter S. Wong
*Assistant Examiner*—Gregory J. Toatley, Jr.
*Attorney, Agent, or Firm*—Burns, Doane, Swecker & Mathis, LLP

[57] ABSTRACT

An image processing device includes a reader for reading an original image and generating image data; a display for displaying a plurality of screens for selecting a desired image edit mode from a plurality of image edit modes, each of the screens having image edit modes which are different between each screens; a display control for selecting a screen among the plurality of screens in response to the type of original image and causing the display to display the selected screen; and image editer for performing image processing on the image data outputted in response to an image edit mode selected through the selected screen. Another image processing device includes a reader for reading an original and outputting image data; a determination device for determining an orientation of the original document read by said reader; a rotater for rotating the image data outputted from the reader on the basis of the direction of said original determined by said determination device; and a display for displaying an original image on the basis of the rotated image data.

9 Claims, 26 Drawing Sheets

ORIGINAL

ORIGINAL READ MEMORY

0°

90° LEFTWARD

180° LEFTWARD

270° LEFTWARD

IMAGE PROCESSING DEVICE WITH ORIGINAL IMAGE DETERMINATION MEANS

BACKGROUND OF THE INVENTION

Field of the Invention

The present invention relates to an image processing device, and more particularly, it relates to an image processing device for reading original images, processing the read original images and printing out the same.

Description of the Related Art

In general, an image processing device is known for reading originals as image data, displaying the read image data on a screen and performing processing such as editing on the basis of the display.

SUMMARY

An object of the present invention is to improve handiness of such a conventional image processing device.

According to an aspect of the present invention, an image processing device comprises read unit for reading an original image and generating image data, display unit for displaying a plurality of screens for selecting a desired image edit mode from a plurality of image edit modes, each of said screens having image edit modes which are different between each screens, determination unit for determining the type of said original image read by said read unit, display control unit for selecting a screen among said plurality of screens in response to the type determined by said determination unit and causing said display unit to display said selected screen, and image edit unit for performing image processing on said image data outputted from said read unit in response to an image edit mode selected through said selected screen displayed on said display unit.

According to another aspect of the present invention, an image processing device comprises read unit for reading an original and outputting image data, determination unit for determining the direction of said original read by said read unit, rotation unit for rotating said image data outputted from said read unit on the basis of the direction of said original determined by said determination unit, and display unit for displaying an original image on the basis of said image data rotated by said rotation unit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

1. Overall Structure of Copying Machine

Figure 1:
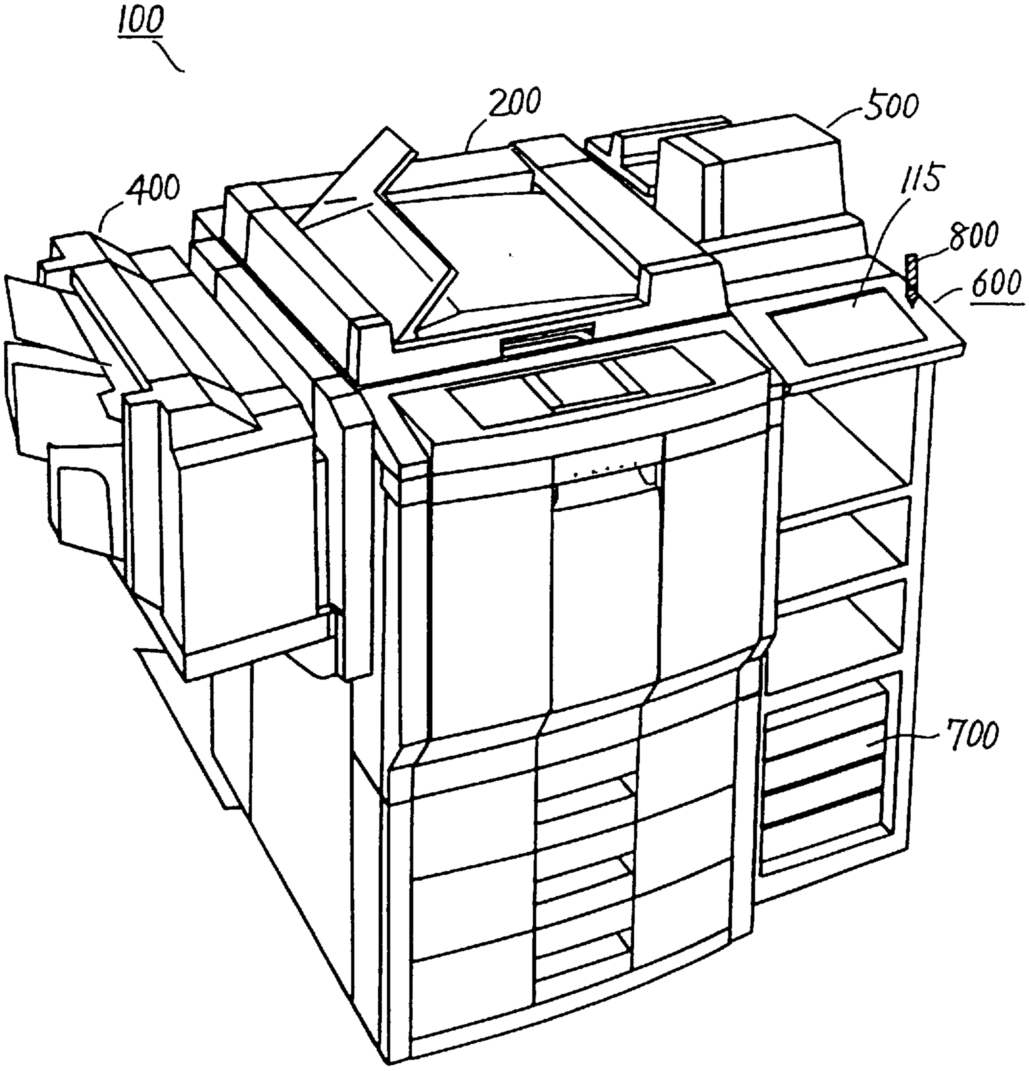
FIG. 1 is a perspective view showing the appearance of a digital color copying machine 100 according to an embodiment of the present invention.

Referring to FIG. 1, a digital color copying machine 100 comprises an auto document feeder (hereinafter referred to as an ADF) 200 for handling a large quantity of originals, a sorter 400 for sorting copy papers, a film projector 500 for copying film originals, a screen editor 600 for displaying read original images and accepting operation instructions from an operator, and a printer controller 700 which is connected to a personal computer or an EWS (work station) for using this copying machine 100 as a color printer.

The screen editor 600 includes a color liquid crystal display (hereinafter referred to as a color LCD) 115 for displaying read originals and displaying various operation menu screens for instructing the operator to perform operations. Further, a transparent tablet (hereinafter referred to as a pen-based interactive tablet) 116 for detecting coordinates instructed by the operator is stacked on the color LCD 115, so that the operator can directly input coordinates on the color LCD 115 with a pen 800.

Figure 2:
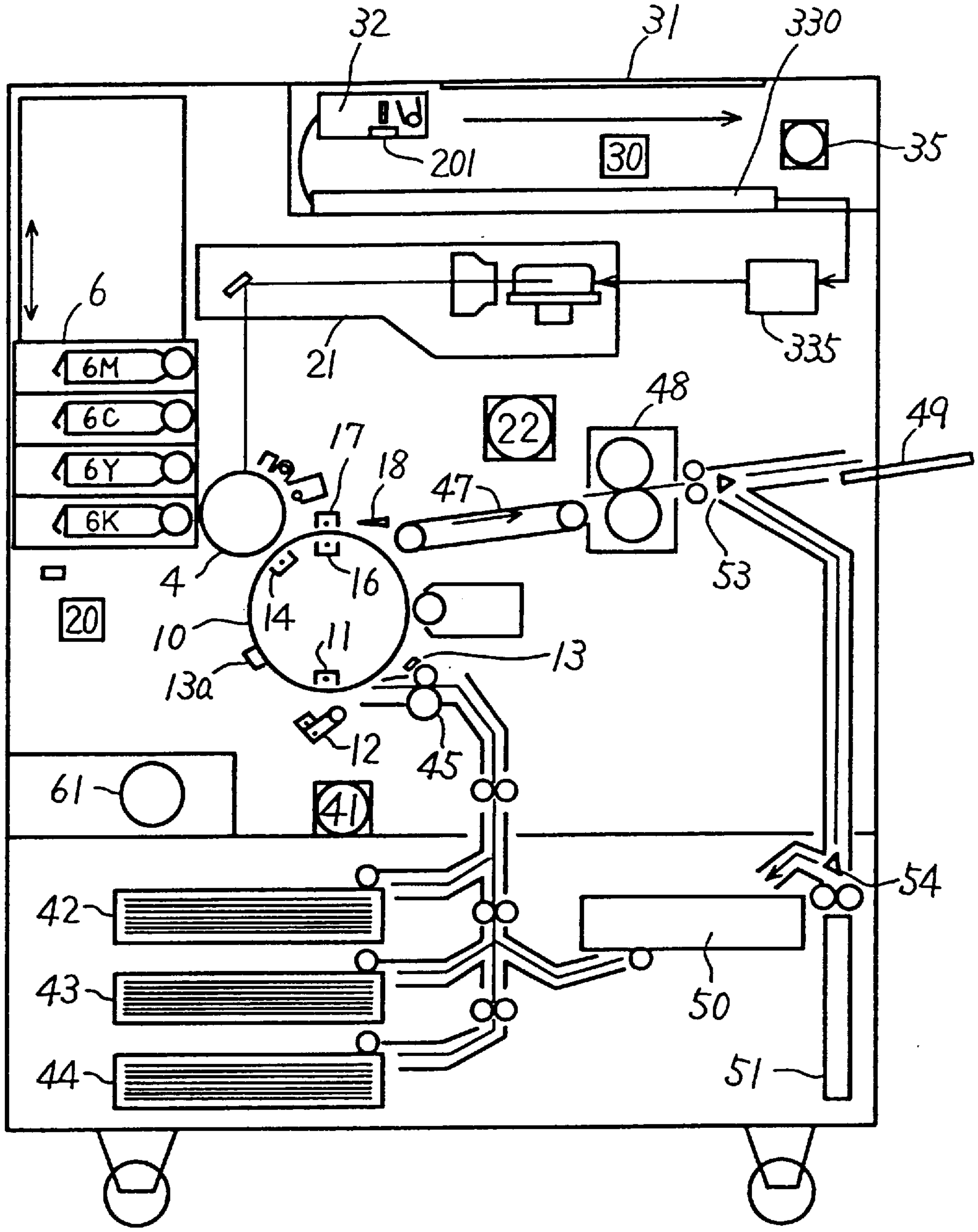
FIG. 2 is a sectional view for illustrating the mechanism of the digital color copying machine 100 shown in FIG. 1.

FIG. 2 is a front sectional view for illustrating the mechanism of the digital color copying machine 100 shown in FIG. 1. The ADF 200, the sorter 400, the film projector 500, the screen editor 600 and the printer controller 700 shown in FIG. 1 are omitted in FIG. 2.

Referring to FIG. 2, the copying machine 100 is generally formed by an image reader 30 and a printer 20. These elements are now described respectively.

(a) Image Reader 30:

The image reader 30 comprises a platen 31 for receiving each original, a scanner 32 for exposing/scanning the original, an image sensor (CCD line sensor) 201 for converting reflected light from the original to an electric signal, an image signal processing part 330 for processing the signal from the image sensor 201, a print head control part 335 for outputting an image signal to the printer 20 on the basis of the signal from the image signal processing part 330, and a pulse motor 35 for driving the scanner 32.

An image of the original which is placed on the platen 31 is exposed/scanned by the scanner 32, so that reflected light of the image is photoelectrically converted by the image sensor 201. The image signal processing part 330 performs prescribed processing on the photoelectrically converted signal, for generating digital image data for driving a laser diode. The generated digital image data is transmitted to the print head control part 335.

(b) Printer 20:

The printer 20 is generally formed by an image forming part and a paper processing part. The contents thereof are now described.

The image forming part comprises a laser unit 21 which is driven on the basis of the digital image data transmitted from the image reader 30, a photoreceptor drum 4 for writing an electrostatic latent image, a developing unit 6 for development with a toner, a transfer drum 10 for transferring the image to a surface of a paper, and a drum drive motor 22 for driving the photoreceptor drum 4 and the transfer drum 10.

The laser unit 21 is driven by the digital image data inputted from the print head control part 335. The laser unit 21 is driven to form an electrostatic latent image on a surface of the photoreceptor drum 4. The electrostatic image is toner-developed by the developing unit 6, and transferred to the surface of the paper which is held on the transfer drum 10.

At this time, the drum drive motor 22 synchronously drives the photoreceptor drum 4 and the transfer drum 10.

The developing unit 6 is formed by a magenta developing device 6M for development with a magenta toner, a cyan developing device 6C for development with a cyan toner, a yellow developing device 6Y for development with a yellow toner, a black developing device 6K for development with a black toner, four toner hoppers provided on upper portions of the respective developing devices 6M, 6C, 6Y and 6K for supplying the toners of the colors corresponding thereto, and a developing unit motor 61 for vertically moving the developing unit 6.

The paper processing part is formed by storage cassettes 42 to 44 for storing papers for printing, an intermediate storage part 50 for temporarily storing papers, and an inversion unit 51 for inverting the papers.

A paper which is supplied from any of the storage cassettes 42 to 44 or the intermediate storage part 50 is transported to the transfer drum 10 by a transport roller group, and wound on the transfer drum 10. Thereafter toner images on the photoreceptor drum 4 are successively transferred to the paper in four colors at the maximum.

The paper is thereafter separated from the transfer drum 10 so that the images are fixed by a fixer 48, and then discharged from a discharge tray 49.

The copying machine 100 is provided with a timing roller pair 45 for resist timing in paper transportation and a transport belt 47, both of which are driven by a main motor 41.

The transfer drum 10 is provided with a forward end chucking claw for chucking the forward end of the paper, an adsorption charger 11 for making the transfer drum 10 electrostatically adsorb the paper, a paper presser roller 12 for pressing the paper, a transfer charger 14 for transferring the toner images appearing on the photoreceptor drum 4 to the paper, dischargers 16 and 17 for discharging the transfer drum 10 and separating the paper after the toner images (toner images of four colors in case of full-color development) are completely transferred, and a separation claw 18 for separating the paper from the transfer drum 10.

Papers once passed through the aforementioned printing step are introduced into the intermediate storage part 50. A transport passage switching part 53 which is arranged in a transport passage for completely fixed papers is switched to select whether the papers once passed through the printing step are transported to the discharge tray 49 or the intermediate storage part 50.

Another transport passage switching part 54 is provided in a transport passage from the transport passage switching part 53 to the intermediate storage part 50. The transport passage switching part 54 selects whether the transported papers are switched back by the inversion unit 51 and then stored in the intermediate storage part 50 or directly stored in the intermediate storage part 50.

This selection is adapted to select whether the images are transferred to the same surfaces as already printed paper surfaces or rear surfaces when the papers fed from the intermediate storage part 50 are transported to the transfer drum 10 again.

The transfer drum 10 is further provided with a reference position sensor 13 for detecting a reference position of the transfer drum 10 and an actuator plate 13a for driving the reference position sensor 13.

2. Image Edit Mode

Figure 3:
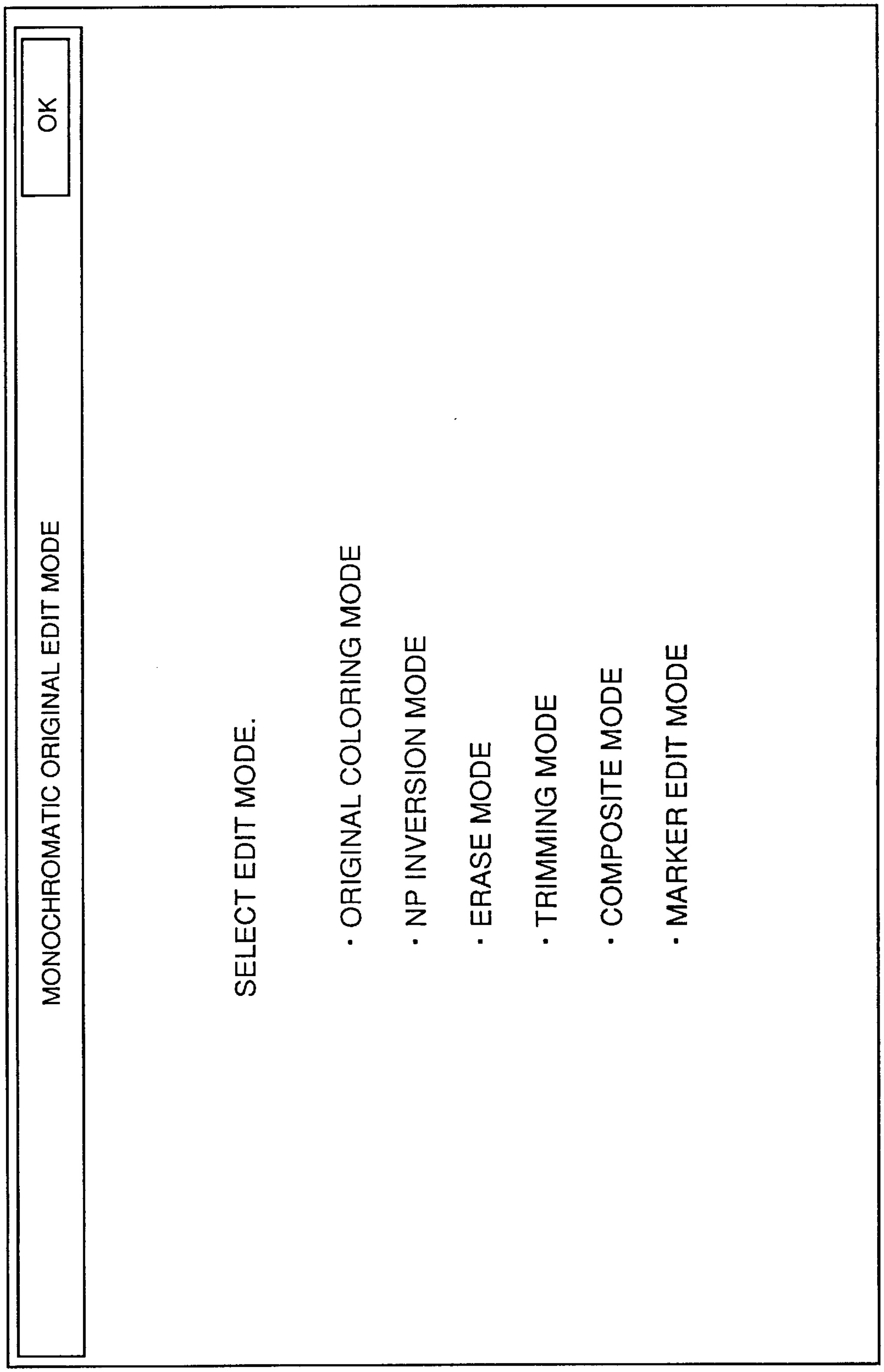
FIG. 3 illustrates an operation screen for selecting an edit mode for a monochromatic original.
Figure 4:
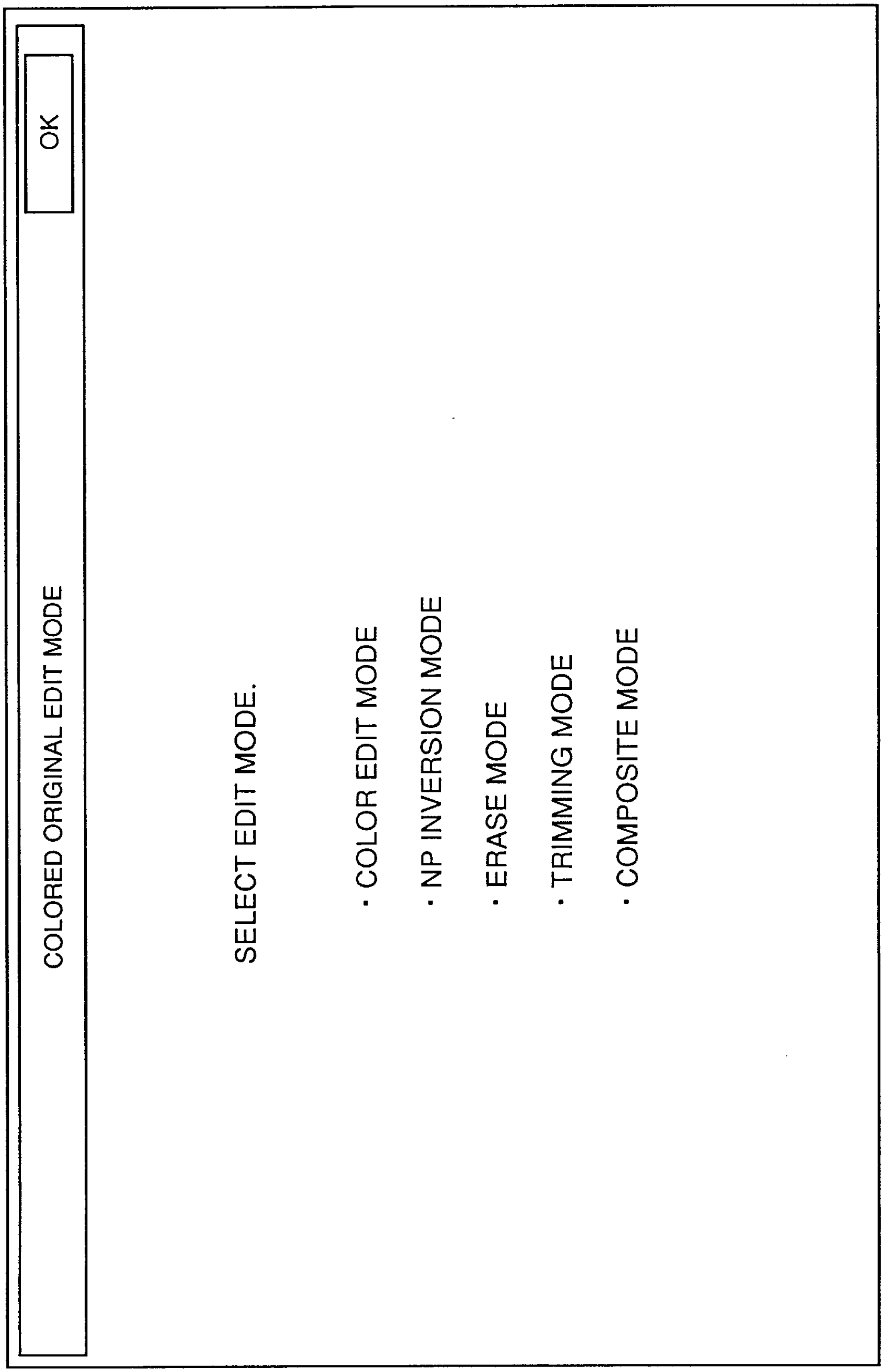
FIG. 4 illustrates an operation screen for selecting an edit mode for a colored original.

This copying machine 100 can make various image edit operations. FIGS. 3 and 4 illustrate operation screens for selecting edit modes for monochromatic (black-and-white) and colored originals respectively. These operation screens are displayed on the color LCD 115. With reference to FIGS. 3 and 4, the respective edit modes executable by this copying machine 100 are now described.

(a) Image Edit Modes for Monochromatic Original:

Referring to FIG. 3, various edit modes including an original coloring mode, a negative/positive inversion mode (NP inversion mode), an erase mode, a trimming mode, a composite mode and a marker edit mode can be selected for a monochromatic original.

The functions of the respective edit modes are as follows:

Original Coloring Mode: A mode of converting an original image (a black part of a black-and-white original) or a background part (a white part of the black-and-white original) to a specified prescribed color and printing the original with respect to an edit area on the original specified through the pen-based interactive tablet 116 or the overall area of the original if no edit area is specified through the pen-based interactive tablet 116.

Negative/Positive Inversion Mode (NP Inversion Mode): A mode of executing negative/positive inversion processing on an edit area on the original specified through the pen-based interactive tablet 116 or the overall area of the original if no edit area is specified through the pen-based interactive tablet 116, and printing the original.

Erase Mode: A mode of erasing an image in an edit area on the original specified through the pen-based interactive tablet 116 and printing the original image.

Trimming Mode: A mode of erasing images from areas other than an edit area on the original specified through the pen-based interactive tablet 116.

Composite Mode: A mode of compositing two edit areas on the original specified through the pen-based interactive tablet 116 with each other and printing the composite edit area on a single paper.

Marker Edit Mode: The operator encloses an area of the original image to be edited with a color marker of a prescribed color thereby setting an edit area. The copying machine 100 automatically determines the edit area enclosed with the marker, and performs prescribed edit processing on the original image in the edit area for printing the same. Color markers of eight colors can be used at the maximum, and an arbitrary edit mode can be set every color. The edit modes which can be set for the respective colors are the original coloring mode, the negative/positive inversion mode, the erase mode and the trimming mode. The edit area(s) specified by the marker(s) can be corrected or added through the pen-based interactive tablet 116, as described in detail later.

(b) Image Edit Modes for Colored Original:

Referring to FIG. 4, various edit modes which can be set for a colored original are now described. With respect to a colored original, a negative/positive inversion mode (NP inversion mode), an erase mode, a trimming mode and a composite mode can be set similarly to the aforementioned case of the monochromatic original. The functions of these edit modes for the colored original are identical to those for the monochromatic original. With respect to the colored original, further, a color edit mode can be set in place of the original coloring mode. The function of the color edit mode is as follows:

Color Edit Mode: A mode of converting a color on a specified original image to a specified prescribed color with respect to an edit area on the original specified through the pen-based interactive tablet 116 or the overall area of the original if no edit area is specified through the pen-based interactive tablet 116.

In the colored original, it is difficult to determine an edit area with a color marker since the original image itself is colored, and hence no marker edit mode can be set.

3. Control Circuit

Figure 5:
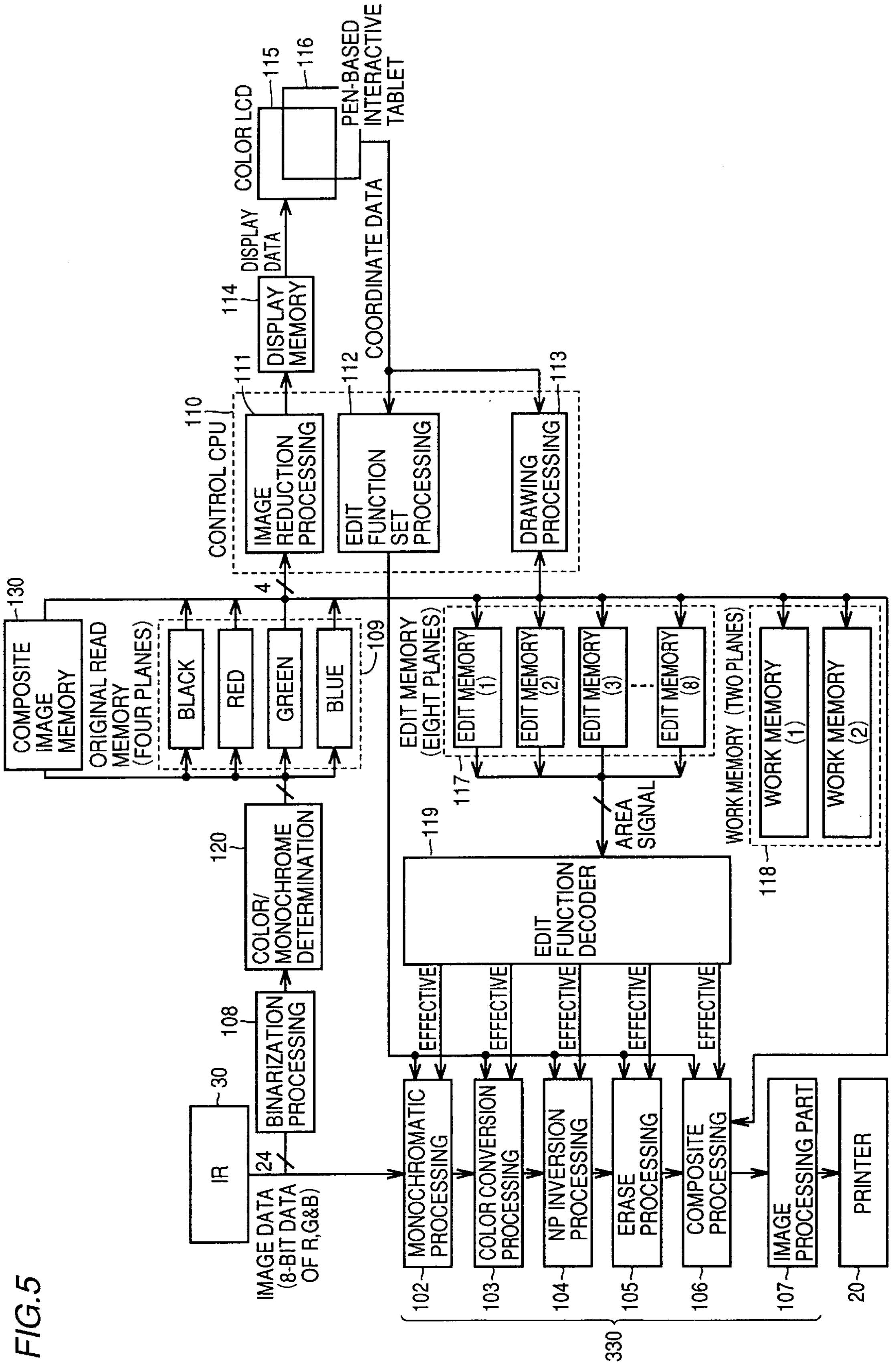
FIG. 5 is a block diagram of a control circuit for image processing provided in the copying machine shown in FIG. 1.

FIG. 5 is a block diagram of a control circuit for image processing, including the image signal processing part 330, provided in the copying machine 100 shown in FIG. 1.

Referring to FIG. 5, the control circuit for image processing comprises the image reader 30, a monochromatic processing part 102 for performing monochromatic processing of replacing image data (8-bit pixels of red, green and blue) acquired by the image reader 30 with prescribed monochromatic data, a color conversion processing part 103 for performing color conversion processing of replacing specific color image data in a signal outputted from the monochromatic processing part 102 with another color image data, an NP inversion processing part 104 for performing NP (negative/positive) inversion processing on a signal outputted from the color conversion processing part 103, an erase processing part 105 for erasing a part of a signal outputted from the NP inversion processing part 104, a composite processing part 106 for compositing two image data into single image data, and an image processing part 107 for performing other image processing, and image data outputted from the image processing part 107 is outputted to and printed by the printer 20.

The control circuit further comprises a binarization processing part 108 for binarizing image data outputted from the image reader 30, a color/monochrome determination part 120 for forming histograms of lightness of the binarized image data thereby determining whether the inputted image is colored or monochromatic, an original read memory 109 consisting of memories for four planes for dividing the image data outputted through the color/monochrome determination part 120 into image data by respective colors of black, red, green and blue and storing the same, a composite image memory 130 for temporarily storing the image data for composition, a control CPU 110 for controlling read and outputted images, a display memory 114 for recording contents displayed on the color LCD 115, the color LCD 115, the pen-based interactive tablet 116 stacked on the color LCD 115, an edit memory 117 formed by memories for eight screens employed for editing the image data, a work memory 118 consisting of memories for two screens forming working areas, and an edit function decoder 119 for controlling which one of the monochromatic processing part 102, the color conversion processing part 103, the NP inversion processing part 104, the erase processing part 105 and the composite processing part 106 is made effective on the basis of the data recorded in the edit memory 117, as a block for reading and displaying the original on the color LCD 115 and editing the same.

The control CPU 110 includes an image reduction processing part 111 for reducing the image for displaying the read original image on the color LCD 115, an edit function set processing part 112 for setting an edit function on the basis of coordinate data inputted from the pen-based interactive tablet 116, and a drawing processing part 113 for performing drawing processing of an area to be edited similarly on the basis of the inputted coordinate data.

The image reduction processing part 111, the edit function set processing part 112 and the drawing processing part 113 express respective functions of a program executed by the control CPU 110, which has no dedicated hard logic circuits for attaining the respective functions in correspondence to the respective processing parts.

4. Flows of Processing of Control Circuit

The processing flows in the block shown in FIG. 5 are now described. The processing flows generally include a processing flow of reading the original and displaying the same on the color LCD 115, and another processing flow of printing the read image data by the printer 20.

In the original display processing, image data read by the image reader 30 is displayed on the color LCD 115 through the binarization processing part 108, the color/monochrome determination part 120, the original read memory 109, the control CPU 110 and the display memory 114.

In the print processing, on the other hand, image data read by the image reader 30 is outputted to the printer 20 through the monochromatic processing part 102, the color conversion processing part 103, the NP inversion processing part 104, the erase processing part 105, the composite processing part 106 and the image processing part 107.

(a) Display of Original Image:

The processing flow in the original display processing is now described in detail.

Digital image data outputted from the image reader 30 in the original display processing is binarized by the binarization processing part 108. The digital image data outputted from the image reader 30 is full-color image data of 400 DPI having 8-bit pixels of red, green and blue. In order to store the data in the memory as such, an enormous memory capacity is necessary. Therefore, the digital image data outputted from the image reader 30 is binarized in the binarization processing part 108, and its resolution is reduced from 400 DPI to 100 DPI. Thus, the information quantity is reduced.

Then, the binarized data is inputted in the color/monochrome determination part 120.

The color/monochrome determination part 120 calculates a lightness histogram of all pixels of the original, and a lightness histogram of achromatic pixels in the original. On the basis of the two types of histograms, a determination is made as to whether the original image is colored or monochromatic. The processing performed in the color/monochrome determination part 120 is described in detail later.

The image data outputted from the color/monochrome determination part 120 is stored in the original read memory 109. The original read memory 109 consists of a structure of four planes of black, red, green and blue. When the original is colored, the image data of the read original is stored in the respective memories for red, green and blue. If the original is monochromatic, on the other hand, the image data is stored in the memory for black. In case of an original whose edit area is specified with a color marker by marker editing, however, the memories for red, green and blue are used also for a monochromatic original, as described above.

In the marker edit mode, image data corresponding to images drawn with color markers for specifying the edit areas are stored in the memories for red, green and blue. The currently stored image data corresponds to the images of the color markers, and is not the image data of the original images of the edit areas specified with the color markers. The color markers can be prepared from eight colors including red, green, blue and colors expressed by combinations thereof in total, and any one of red, green and blue or a plurality of memories are combined and used in response to the colors of the markers.

The image data stored in the image read memory 109 is transmitted to the image reduction processing part 111 provided in the control CPU 110, so that its resolution is further reduced. While the image data in the original read memory 109 has the resolution of 100 DPI, the resolution of display on the color LCD 115 is about 30 to 50 DPI, and hence the resolution is reduced here due to the necessity for further image reduction.

The image data reduced by the image reduction processing part 111 is stored in the display memory 114. The image data stored in the display memory 114 is directly displayed on the color LCD 115.

The pen-based interactive tablet 116 is stacked on the color LCD 115. The operator can simply select an operation menu or specify an edit area with a pen on the pen-interactive tablet 116.

The operation such as the selection of the operation menu or setting of the edit area made by the operator is processed by the control CPU 110.

The color LCD 115 continuously displays operation menu screens on the basis of coordinate data inputted from the pen-interactive tablet 116, whereby the operator can set various modes on an interactive basis. Further, the operator can select a desired mode by continuously outputting a plurality of hierarchically structured operation menus on the color LCD 115.

When the instructions for image editing (setting of an image edit mode, setting of an edit area or the like) inputted by the operator through the pen-based interactive tablet 116 is settled, the instruction is processed by the edit function set processing part 112 and the drawing processing part 113 included in the control CPU 110.

In response to the image edit mode settled by the operator, the edit function set processing part 112 outputs set signals to the monochromatic processing part 102, the color conversion processing part 103, the NP inversion processing part 104, the erase processing part 105 and the composite processing part 106, for activating these processing parts. Thus, various processes are selectively performed on the digital image data inputted from the image reader 30.

In more concrete terms, the monochromatic processing part 102 is activated when the original coloring mode is set, the NP inversion processing part 104 is activated when the negative/positive inversion mode is set, the erase processing part 105 is activated if the erase or trimming mode is set, the composite processing part 106 is activated when the composite mode is set, and the color conversion processing part 103 is activated when the color edit mode is set. If the marker edit mode is set, any one or a plurality of the monochromatic processing part 102, the NP inversion processing part 104 and the erase processing part 105 are activated in response to the respective marker colors in the marker edit mode.

On the other hand, the drawing processing part 113 performs processing of determining the edit areas settled by the operator (the edit areas settled by specification with the markers and specification through the pen-based interactive tablet 116).

In more concrete terms, the drawing processing part 113 sets edit areas of the image with the edit memory 117 and the work memory 118. The edit memory 117 is formed by memories of eight planes, so that information of the target edit areas are stored in the memories of the respective planes every set edit mode. The edit areas are stored in the memories as figures filled with the markers or through the pen-based interactive tablet 116. In other words, only the parts of the filled figures recorded in the edit memory 117 are subjected to editing in the set edit mode.

The edit function decoder 119 inputs area signals based on the figures recorded in the edit memory 117, and outputs effective signals to the monochromatic processing part 102, the color conversion processing part 103, the NP inversion processing part 104 and the erase processing part 105 at a timing when the image reader 30 outputs the image data corresponding to the set edit areas. Thus, the processing part activated by the edit function set processing part 112 described above performs prescribed image processing on the image data in the edit areas.

The work memory 118 consisting of two planes is used as a work memory for performing drawing processing on the edit memory 117.

The image-processed data is printed on the paper by the printer 20 in an electrophotographic system.

5. Concrete Examples of Marker Editing

Operations of the aforementioned control circuit are now described with reference to concrete examples of editing in the marker edit mode.

Figure 6A:
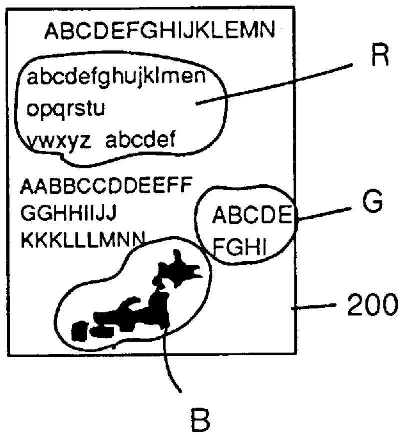
FIGS. 6A, 6B, 7A and 7B illustrate concrete examples of editing in a marker edit mode.

For example, it is assumed here that the operator sets the negative/positive inversion mode, the original coloring mode and the erase mode for edit areas enclosed with red, green and blue markers respectively in the marker edit mode, and marks the original with the markers of red R, green G and blue B as shown in FIG. 6A.

This original is read by the image reader 30, binarized in the binarization processing part 108, and thereafter stored in the original read memory 109 through the color/monochrome determination part 120.

Figure 6B:
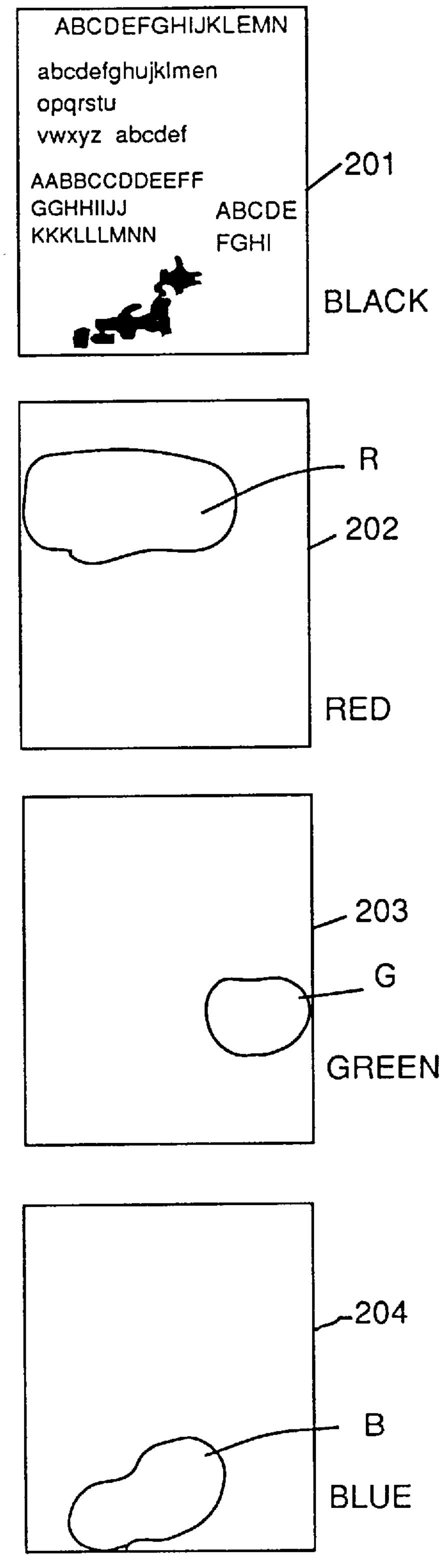

At this time, a plane 201 for recording black data stores data of only a black-and-white part of the original in the original read memory 109, as shown in FIG. 6B.

On the other hand, planes for recording respective data of red, green and blue record only parts corresponding to the colors of the markers applied to the original, as shown at 202 to 204 respectively.

The original image stored in the original read memory 109 is transferred to the display memory 114 through the control CPU 110,.to be displayed on the color LCD 115.

At this time, whether the read original is displayed as such or an image subjected to image processing by specification with the markers is selected by setting by the operator or auto setting by the copying machine 100.

Figure 7A:
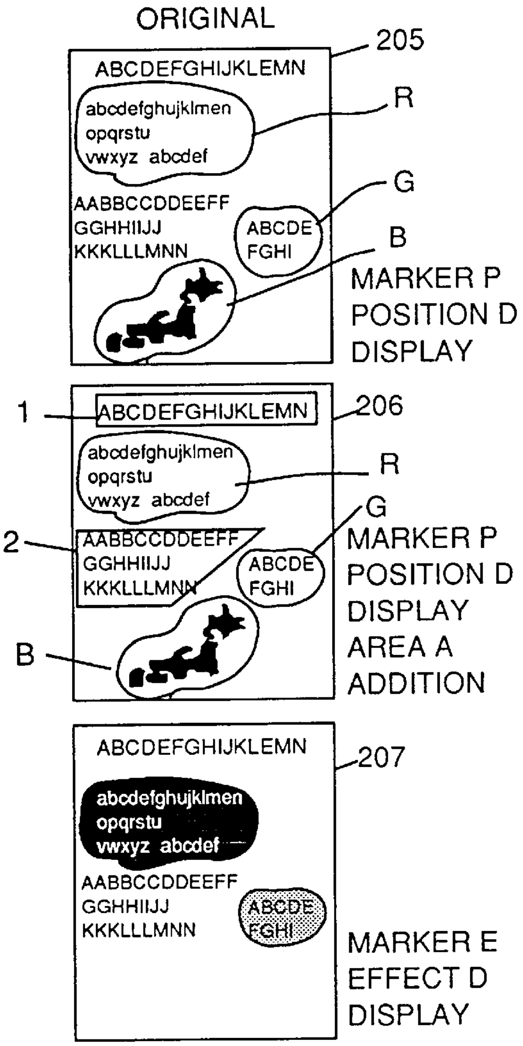

When a mode (marker position display mode) for displaying figures posted with markers as such along with the original, the same image as the read original image is displayed on the color LCD 115, as denoted by reference numeral 205 in FIG. 7A.

When a mode for displaying an effect of image processing by marker instruction (a mode of displaying a result of image processing) is selected, on the other hand, an image obtained after image edit processing is performed on respective edit areas on the basis of the marker colors and posted positions thereof is displayed as denoted by reference numeral 207.

In the state of displaying the screen in the marker position display mode as denoted by reference numeral 205, the operator can further make posting in the displayed screen with a marker through the pen-based interactive tablet 116.

For example, the operator can newly add edit areas 1 and 2 to the state denoted by reference numeral 205 in FIG. 7A, as denoted by reference numeral 206.

In other words, the operator can recognize the states before and after the image processing through the color LCD 115 and can make marker posting for image processing directly from the pen-based interactive tablet 116, whereby handiness of the copying machine 100 is improved.

The respective planes of the edit memory 117 store figures indicating the edit areas, which are set by the operator's marker posting or input from the pen-based interactive tablet 116.

Assume that the edit area denoted by reference numeral 206 in FIG. 7A is set, for example.

Figure 7B:
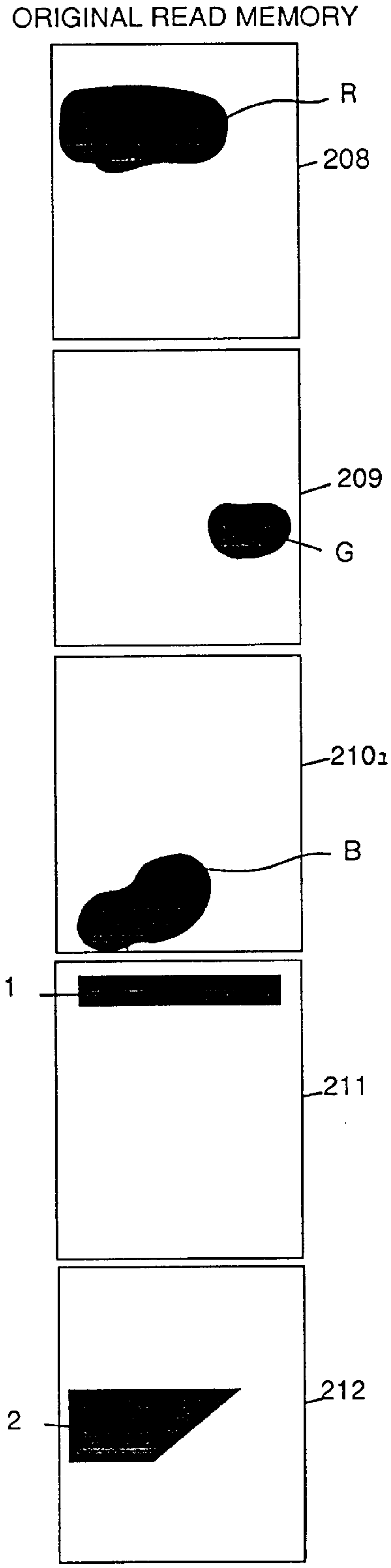

Referring to FIG. 7B, an edit area R enclosed with a red marker posted in a monochromatic original is stored in a first plane 208 of the edit memory 117 in such a state that the interior of this area R is filled.

Similarly, second and third planes 209 and 210 in the edit memory 117 store edit areas G and B which are enclosed with green and blue markers respectively in filled states.

Further, fourth and fifth planes 211 and 212 of the edit memory 117 store the edit areas 1 and 2 inputted from the pen-based interactive tablet 116 in filled states respectively.

The edit function decoder 119 recognizes the filled areas stored in these planes of the edit memory 117, thereby identifying areas to be subjected to image processing and outputting signals to the respective processing parts 102 to 106.

Figure 8:
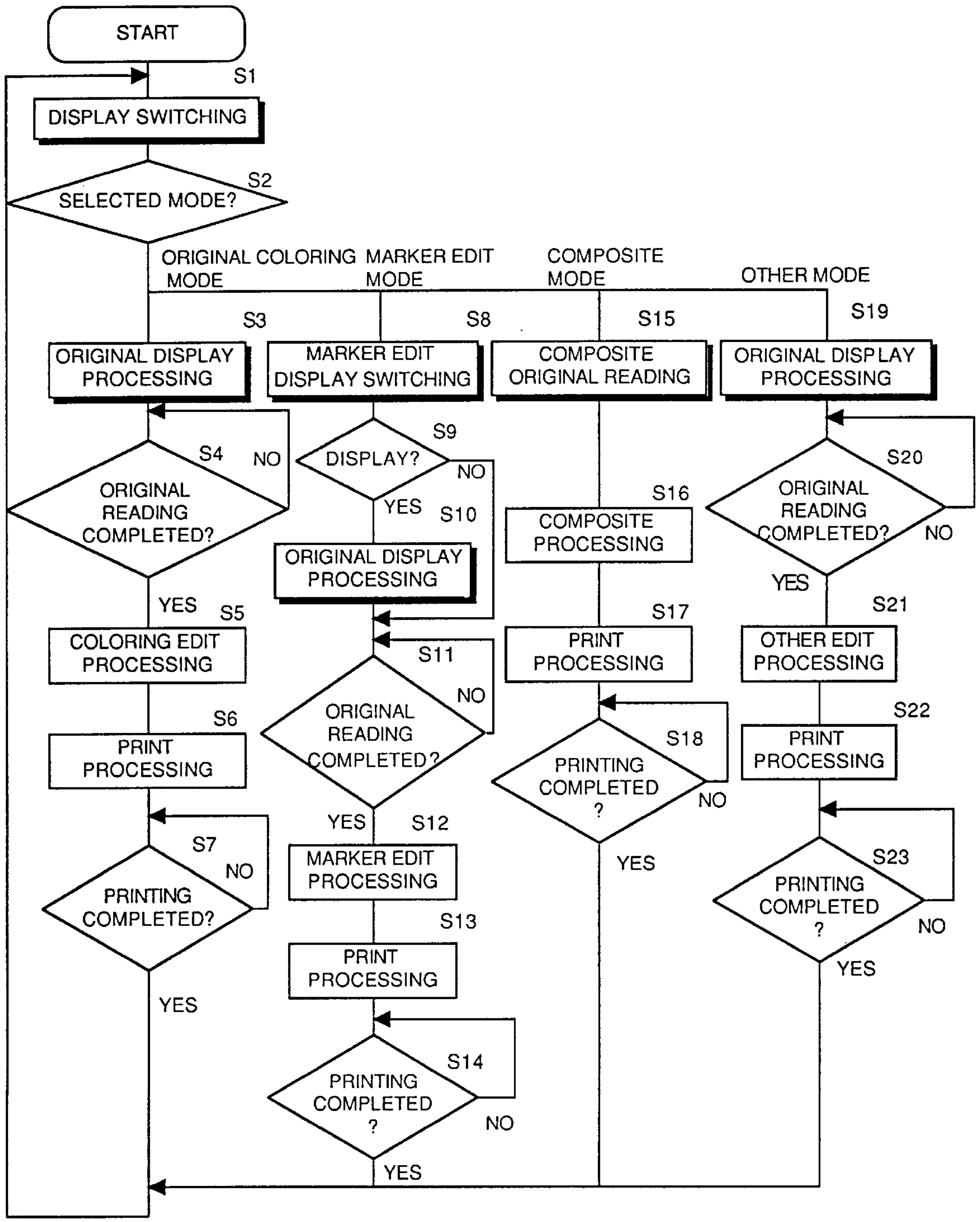
FIG. 8 is a flow chart showing the procedure of edit processing executed by the control circuit shown in FIG. 5.

6. Description of Control Procedure Based on Flow Charts (a) Main Routine:

The procedure of edit processing executed by the control circuit shown in FIG. 5 is now described on the basis of a flow chart shown in FIG. 8.

First, a display switching subroutine is executed for displaying an operation menu screen for setting an edit mode on the color LCD 115 at a step S1. The current processing is described in detail with reference to FIG. 9 later.

Then, at a step S2, the edit mode selected at the step S1 is determined and the process is branched to processing corresponding to each edit mode.

When the original coloring mode is selected as the edit mode, processing at steps S3 to S7 is executed. In more concrete terms, the color LCD 115 displays an original image read by prescanning so that the operator confirms the display content and corrects or adds the edit areas at need at the step S3. The edit areas are settled by this processing, and the operator pushes down a start key, so that main scanning is executed to start reading of the original. Completion of the reading is determined at a step S4, so that the monochromatic processing part 102 performs image processing on the image data of the edit areas, and converts the original image to prescribed colors at the step S5, as hereinabove described. Thereafter print processing is executed at the step S6 in succession, and the colored original image is printed on a paper by the printer 30. Completion of the printing is determined at the step S7, and the process returns to the step S1 for next copying. An original display processing subroutine executed at the step S3 is described in detail with reference to FIG. 14 later.

When the marker edit mode is selected as the edit mode, processing at steps S8 to S14 is executed. In more concrete terms, a marker edit display switching subroutine is executed at the step S8 for determining whether or not the original image read by prescanning is displayed on the color LCD 115, and the original image is displayed on the color LCD 115 at the steps S9 and S10 in response to the result of the determination. The marker edit display switching subroutine at the step S8 is described in detail with reference to FIG. 16 later. An original display processing subroutine shown at the step SIO is performed similarly to the aforementioned step S3, and described in detail with reference to FIG. 14 later. When the original image is displayed on the color LCD 115, the operator confirms the display content and corrects or adds the edit areas at need. The edit areas are settled by this processing, so that the operator pushes down the start key and main scanning is executed to start reading of the original. Completion of the reading is determined at the step S11, so that the processing parts 102 to 105 selectively perform image processing on the image data of the edit areas set with the markers or through the pen-based interactive tablet 116 at the step S12, so that set image editing is executed every marker color. Thereafter print processing is executed at the step S13 in succession, so that the original image subjected to image edition is printed on a paper by the printer 30. Completion of the printing is determined at the step S14, and the process returns to the processing at the step S1 again for next copying.

When the composite mode is selected as the edit mode, processing at steps S15 to S18 is executed. In more concrete terms, the color LCD 115 displays two read original images, so that the operator moves the two displayed originals on the display screen through the pen-based interactive tablet 116, and settles a composite position at the step S15. The composite position is settled by this processing and the operator pushes down the start key, so that the image data are read from the composite image memory 130 and the original read memory 109 and the composite processing part 106 composites the two original images with each other at the step S16. Thereafter print processing is executed at the step S17 in succession, so that a composite image is printed on a paper by the printer 30. Completion of the printing is determined at the step S18, and the process returns to the processing of the step S1 again for next copying. A composite original read subroutine executed at the step S15 is described in detail with reference to FIG. 23 later.

When the negative/positive inversion mode, the erase mode or the trimming mode is selected as the edit mode, processing is performed in a procedure similar to that for the aforementioned original coloring mode (steps S3 to S7). In processing corresponding to the step S5, however, edit processing corresponding to each edit mode is performed. This processing is illustrated as other edit processing mode in steps S19 to S23.

Figure 9:
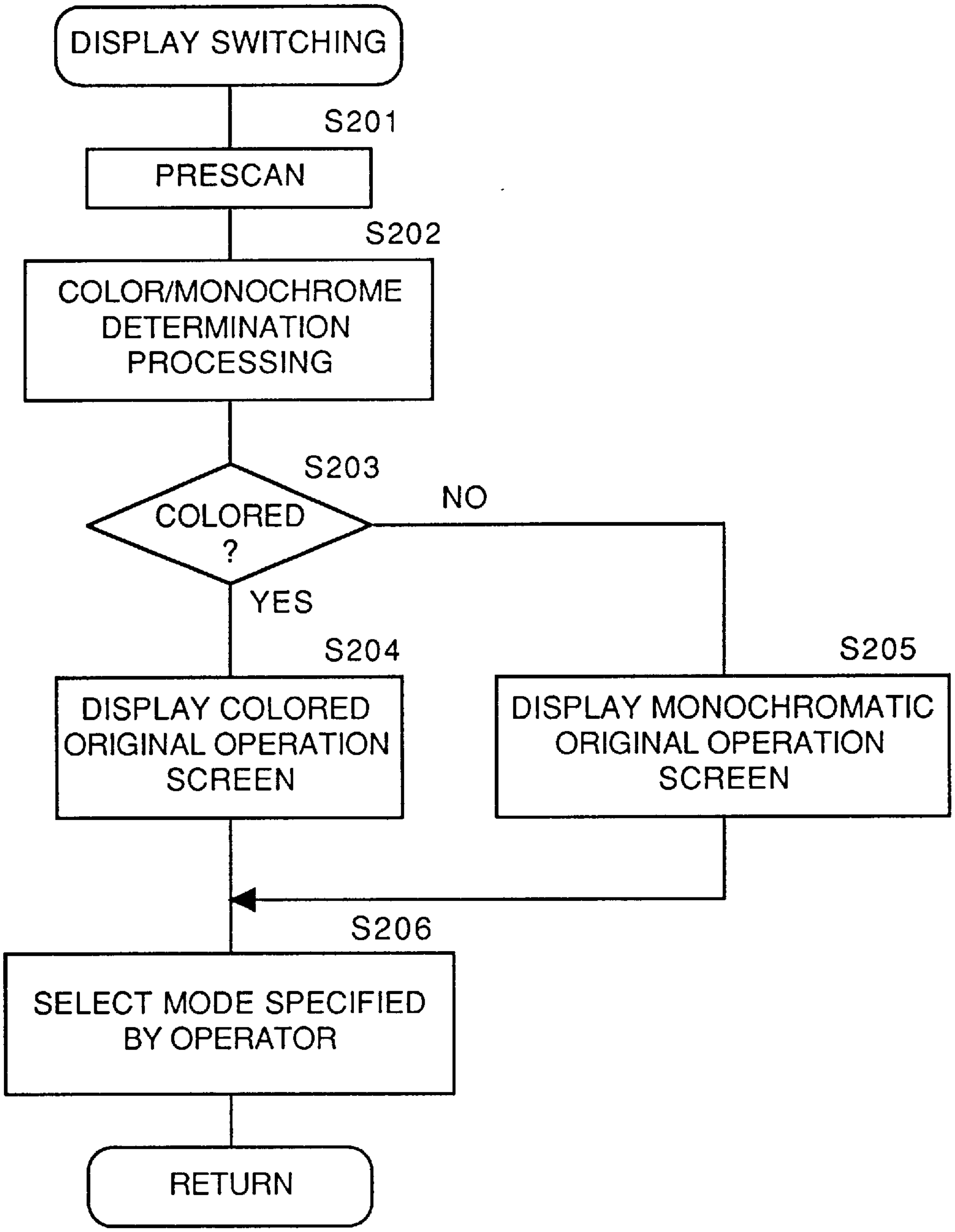
FIG. 9 is a flow chart showing processing in a display switching routine (S1) in FIG. 8.

(b) Display Switching Subroutine:

FIG. 9 is a flow chart showing the display switching subroutine shown at the step S1 in FIG. 8. In this display switching subroutine, the color/monochrome determination part 120 shown in FIG. 3 determines whether the read original image is a colored original such as a photograph or a monochromatic original such as a character image, to switch an operation screen for selecting the edit mode displayed in response to the result of the determination.

In more concrete terms, the image reader 20 executes prescanning at a step S201, to output the image data of the original.

At a step S202, the color/monochrome determination part 120 determines whether or not the original is colored, so that an operation screen (FIG. 4) for editing a colored original is displayed on the color LCD 115 at a step S204 if the determination is of YES at a step S203.

If the determination at the step S202 is of NO at the step S203, an operation screen (FIG. 3) for a monochromatic original is displayed on the color LCD 115 at a step S205.

Namely, the displayed operation screen for edit mode selection is automatically switched on the basis of whether the original is colored or monochromatic. Thus, the operator's labor for mode selection can be reduced. A mode specified by the operator is selected at a step S206.

It is possible to enable selection of whether or not the operation screen is automatically switched by an operation panel. When the operator makes this selection by functional setting, for example, an operation of the copying machine 100 in response to the operator's preference is enabled.

The color/monochrome determination shown at the step S202 is now described.

As hereinabove described, the color/monochrome determination part 120 of FIG. 5 determines whether the original is colored or monochromatic.

Figure 10:
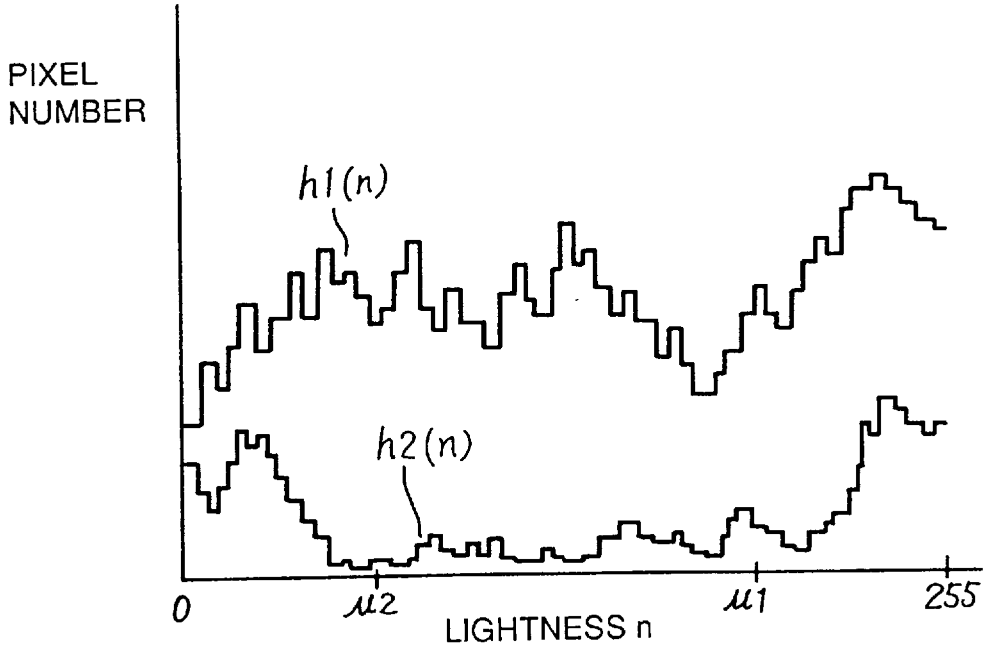
FIGS. 10 and 11 illustrate exemplary histograms in a histogram memory included in a color/monochrome determination part 120.

The color/monochrome determination part 120 has a histogram memory for recording two histograms. Referring to FIG. 10, these histograms include a histogram h1(n) of lightness of all pixels included in the read image data, and a lightness histogram h2(n) of achromatic pixels included in the read image data.

The value of n, indicating the lightness of the pixels, can take any value in the range of 0 to 255. A pixel whose lightness n is zero has the lowest lightness, while that whose lightness n is 255 has the highest lightness.

Namely, the number of pixels having the lightness of n is recorded as the value of h1(nb) of the histogram.

Figure 11:
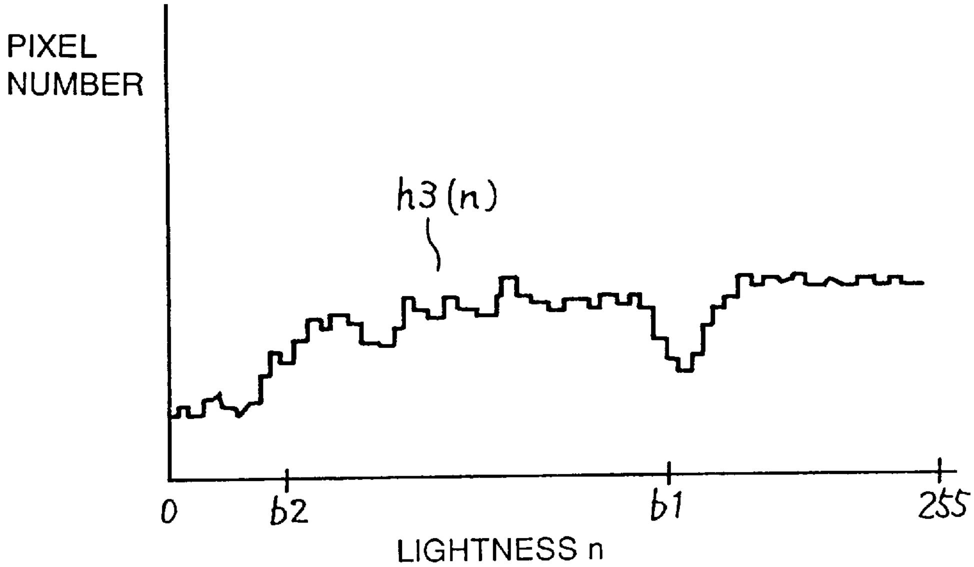

The value of the histogram h2(n) is subtracted from the histogram h1(n), thereby forming a lightness histogram h3(n) of chromatic color pixels included in the original, as shown in FIG. 11.

A determination as to whether one of pixels included in the image data is chromatic or achromatic is made on the basis of a value obtained by identifying maximum and minimum values of R, G and B data which are color data provided in the pixel and subtracting the minimum value from the maximum value. When the value obtained by subtraction is not more than a prescribed value (SREF), the pixel is determined as achromatic so that only the number of achromatic pixels is recorded in the histogram h2(n).

On the basis of these histograms, a number Wn of pixels forming a base (white) area in the original, a number Mn of pixels in a black-and-white mid-tone (gray) area, a number Bn of pixels in a black area, a number Cn of pixels in a color area, and a total sum Sn (indicating the total pixel number in the original size) of the lightness histogram of all pixels are calculated from the following expressions:

$$Wn = \sum_{n=\mu1}^{255} h2(n) \qquad (1)$$

$$Mn = \sum_{n=\mu2}^{\mu1} h2(n)$$

$$Bn = \sum_{n=0}^{\mu2} h2(n)$$

$$Sn = \sum_{n=0}^{255} h1(n)$$

$$h3(n) = h1(n)h2(n)$$

$$Cn = \sum_{n=b2}^{b1} h3(n)$$

In the expressions (1), $\mu1$ represents a threshold value for separating the achromatic pixels into white and mid-tone pixels, and $\mu2$ represents a threshold value for separating the achromatic pixels into mid-tone and black pixels.

On the other hand, b1 and b2 represent upper and lower limit values of lightness for regarding pixels as those of the color area among those not included in the achromatic pixels.

Figure 12:
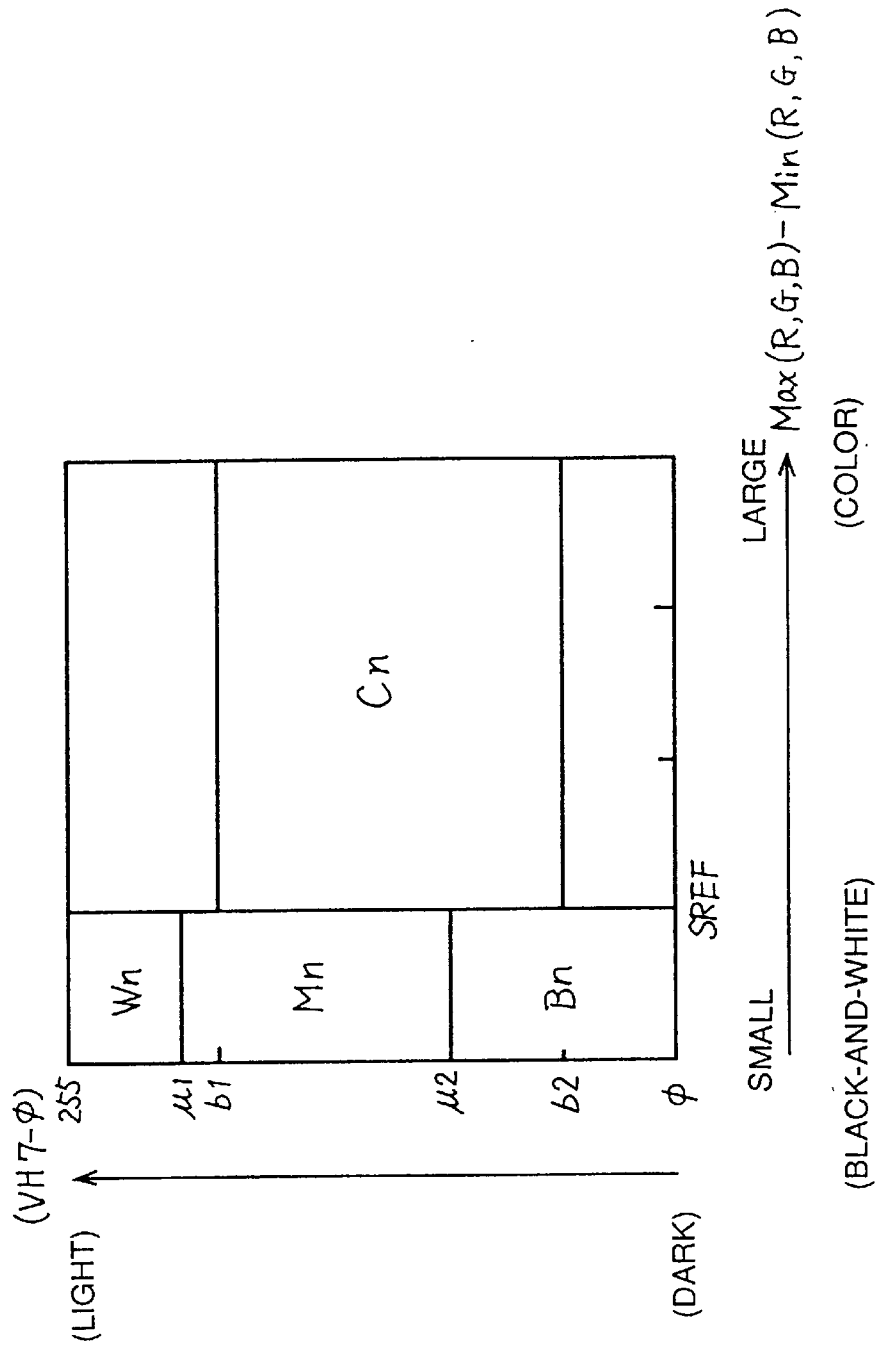
FIG. 12 is adapted to illustrate the standard of pixel classification.

FIG. 12 illustrates areas formed by lightness and hues counted by the aforementioned variables Wn, Mn, Bn and Cn.

Referring to FIG. 12, the axis of abscissas shows the difference between the maximum and minimum values of the R, G and B data which are the color data provided by the pixels, and the axis of ordinates shows lightness of the pixels.

Whether the pixels are chromatic or achromatic is divided by the threshold value SREF on the axis of abscissas.

White, gray and black pixels are identified along the lightness $\mu1$ and $\mu2$ among pixels belonging to an achromatic area (area on the left side) divided by the threshold value SREF.

Among pixels which are present in the chromatic area, on the other hand, those having lightness in the range of b2 to b1 are identified as pixels of the color area.

The color/monochrome determination part 120 determines whether the original is monochromatic or colored with the variables Sn and Cn.

In more concrete terms, the original is determined as monochromatic if a value Cn/Sn is not more than a reference value, while the original is determined as colored if the value Cn/Sn is greater than the reference value.

On the basis of the characteristic of the original (whether the original is colored or monochromatic) determined in the aforementioned manner, the control CPU 110 switches the operation screen for edit mode selection by the operator written in the display memory 114.

(c) Original Display Processing Subroutine:

The original display processing shown at the steps S3, S10 and S19 in FIG. 8 is now described.

In the original display processing, the direction of a character of the read original and that of the original (whether the original is longitudinal or transverse) are determined when the original is read by the image reader 30, for changing the display attitude of the original image displayed on the color LCD 115 on the basis of the result of the determination.

Figure 13:
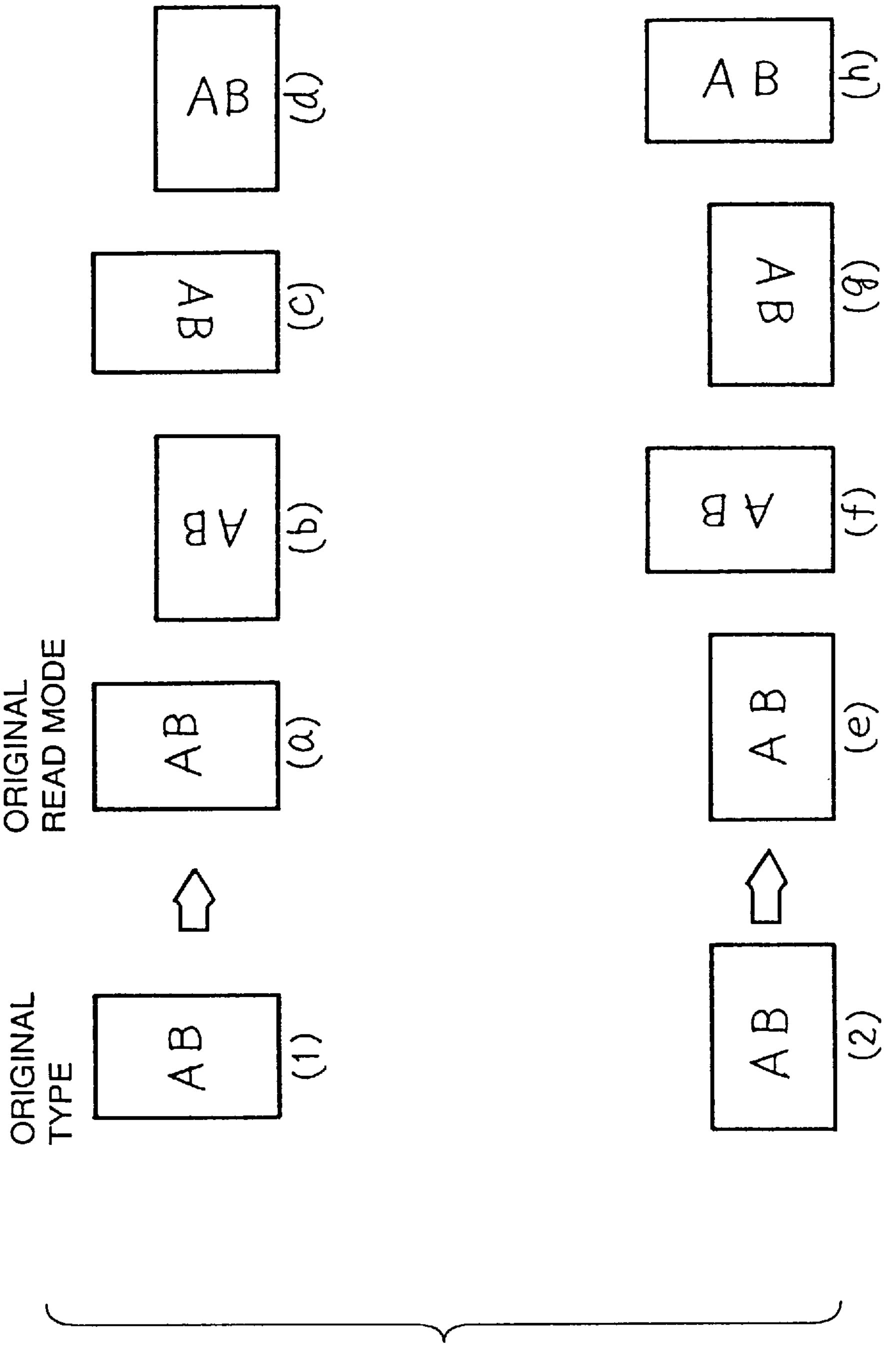
FIG. 13 is adapted to illustrate read originals and directions of displayed originals.

Referring to FIG. 13, read originals include a portrait original (longitudinal original) shown at (1) and a landscape original (transverse original) shown at (2).

When image data of these originals are written in the original read memory 109, storage states (attitudes) of the original images in the memory 109 vary with the directions of the originals on the platen 31, i.e., the directions of the originals with respect to the read direction of the image reader 30.

The portrait original is stored in the memory 109 in any of the states shown at (a) to (d) in FIG. 13, while the landscape original is stored in the memory 109 in any of states (e) to (h).

In a conventional copying machine, these data stored in the original read memory 109 are displayed on the color LCD 115 as such.

Therefore, when an original image is displayed in the state (c) or (g), for example, it is difficult for the operator to confirm the state of the original, and the subsequent edit operation is hindered in this case.

In the original display processing, therefore, the directions of the character and the original are determined for bringing the direction of the original into a readily recognizable state for the operator.

In more concrete terms, the original image is longitudinally displayed on the color LCD 115 while the character is erected for the operator when the read original is determined as a portrait, regardless of the direction of the read original.

When the original is a landscape original, on the other hand, the original image is transversely displayed on the color LCD 115 and the character is displayed in a state erected for the operator regardless of the direction of the read original.

Figure 14:
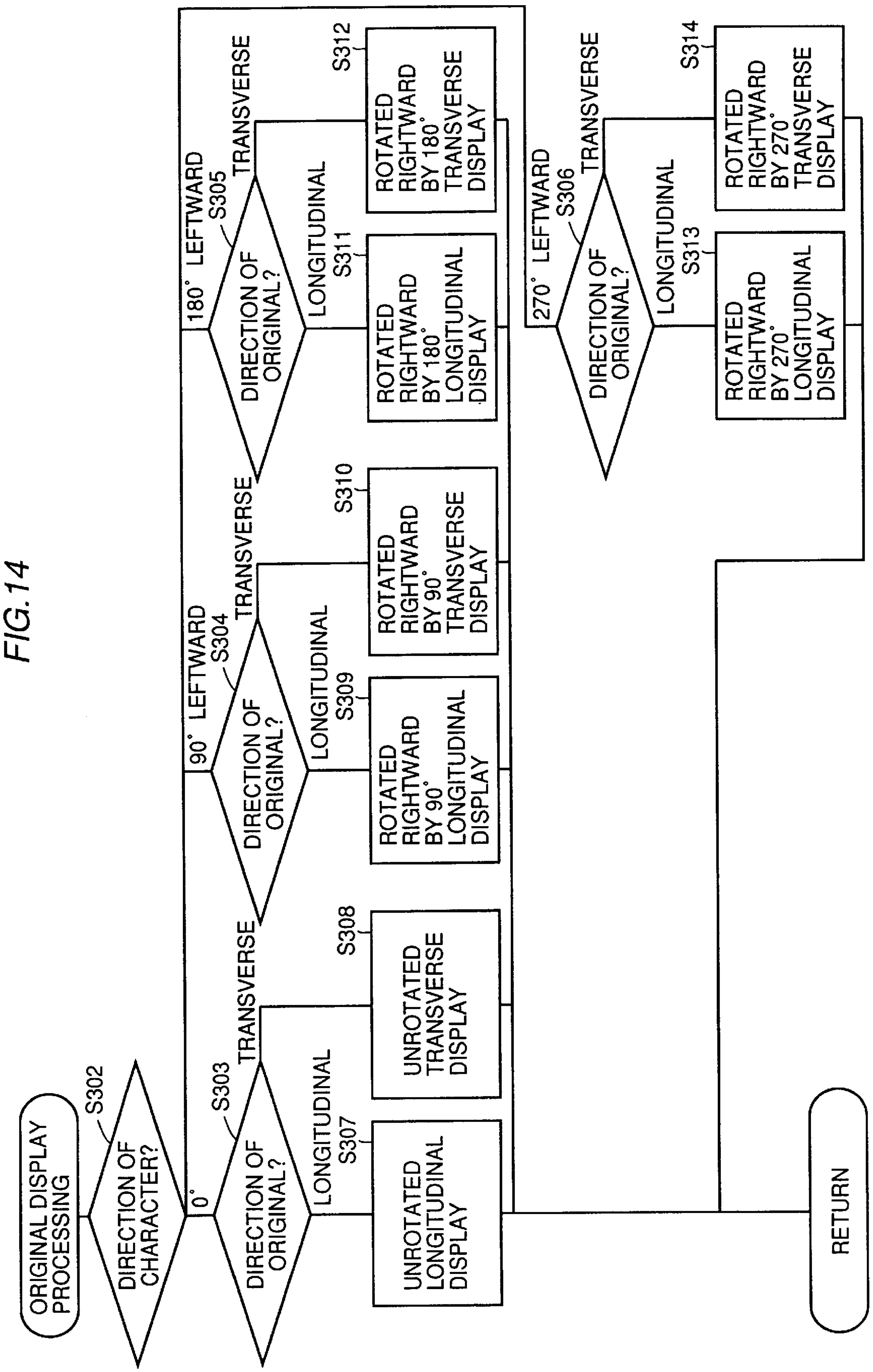
FIG. 14 is a flow chart showing processing in original display processing (S3, S10 or S19) shown in FIG. 8.

FIG. 14 is a flow chart showing the procedure of the original display processing subroutine.

At a step S302, the original read memory 109 reads the image data obtained by prescanning, for determining the direction of a character included in the original image. A technique disclosed in U.S. Pat. No. 5,077,811 or the like, for example, can be employed as the processing for determining the direction of the character.

Figure 15:
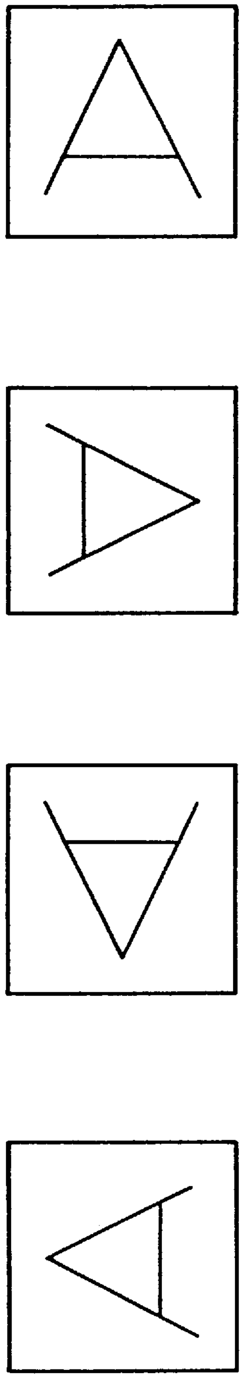
FIG. 15 is adapted to illustrate directions of a character.

Referring to FIG. 15, a determination is made at a step S302 as to the direction of the character, which is one of a state erected with respect to the operator (0E) and states rotated leftward by 90E, 180E and 270E from the state of 0E respectively.

Processing at a step S303 is performed if the character is in the state of 0E, while processing is performed at a step S304, S305 or S306 if the character is in any of the states of 90E, 180E and 270E.

At each of the steps S303 to S306, a determination is made as to whether or not the original exhibits a landscape or a portrait.

When the character is directed at 0E and the direction of the original is determined as longitudinal (portrait original) at the step S303, the original image is not rotated at a step S307 but the original data is read from the original read memory 109 as such and stored in the display memory 114, so that the original is longitudinally displayed.

When the direction of the original is determined as transverse (landscape) at the step S303, the original image is not rotated at a step S308 but the original data is read from the original read memory 109 as such and stored in the display memory 114, so that the original is transversely displayed.

Also at the step S304, the original image is longitudinally or transversely displayed at a step S309 or S310 in correspondence to a portrait original or a landscape original. At this time, the image data is rotated rightward by 90E so that the character is erected with respect to the operator, and stored in the display memory 114.

Similarly, the original image is displayed in correspondence to a portrait original or a landscape original after the processing at the step S305 or S306. At this time, the image data is rotated rightward by 180E or 270E so that the character is erected with respect to the operator, and stored in the display memory 114.

Due to such processing, the character of the original is regularly displayed to be erected with respect to the operator, while the original image can be displayed in response to the landscape or portrait.

Figure 16:
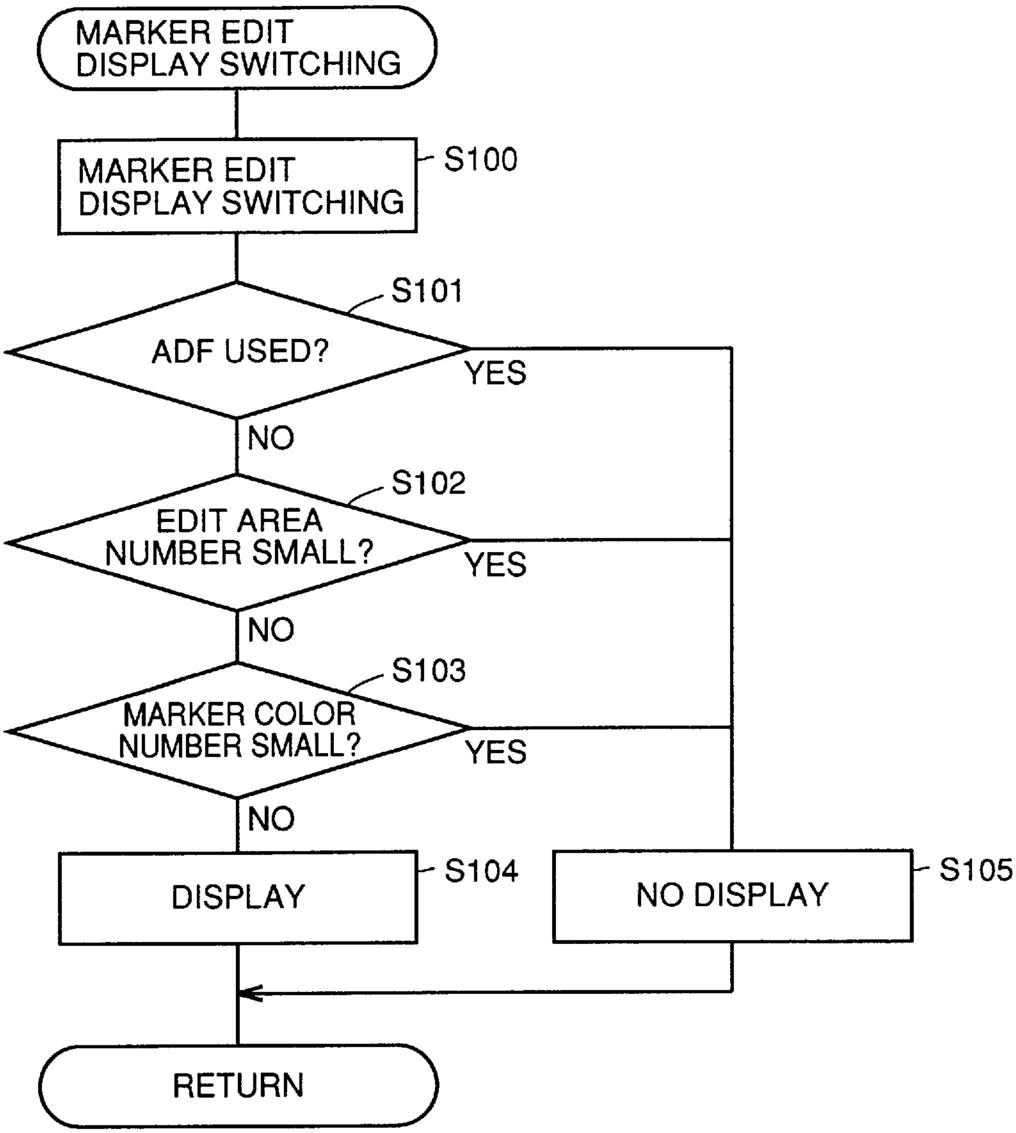
FIG. 16 is a flow chart showing processing in a marker edit display switching routine (S8) in FIG. 8.

(d) Marker Edit Display Switching Subroutine:

The marker edit display switching subroutine shown at the step S8 in FIG. 8 is now described. FIG. 16 is a flow chart showing the procedure of the marker edit display switching subroutine.

When the marker edit mode is selected on the operation screen for edit mode selection displayed at the step S1 in FIG. 8 as described above, a screen for setting the colors of used color markers and edit modes therefor is displayed on the color LCD 115 at a step S100 in FIG. 16.

Figure 17:
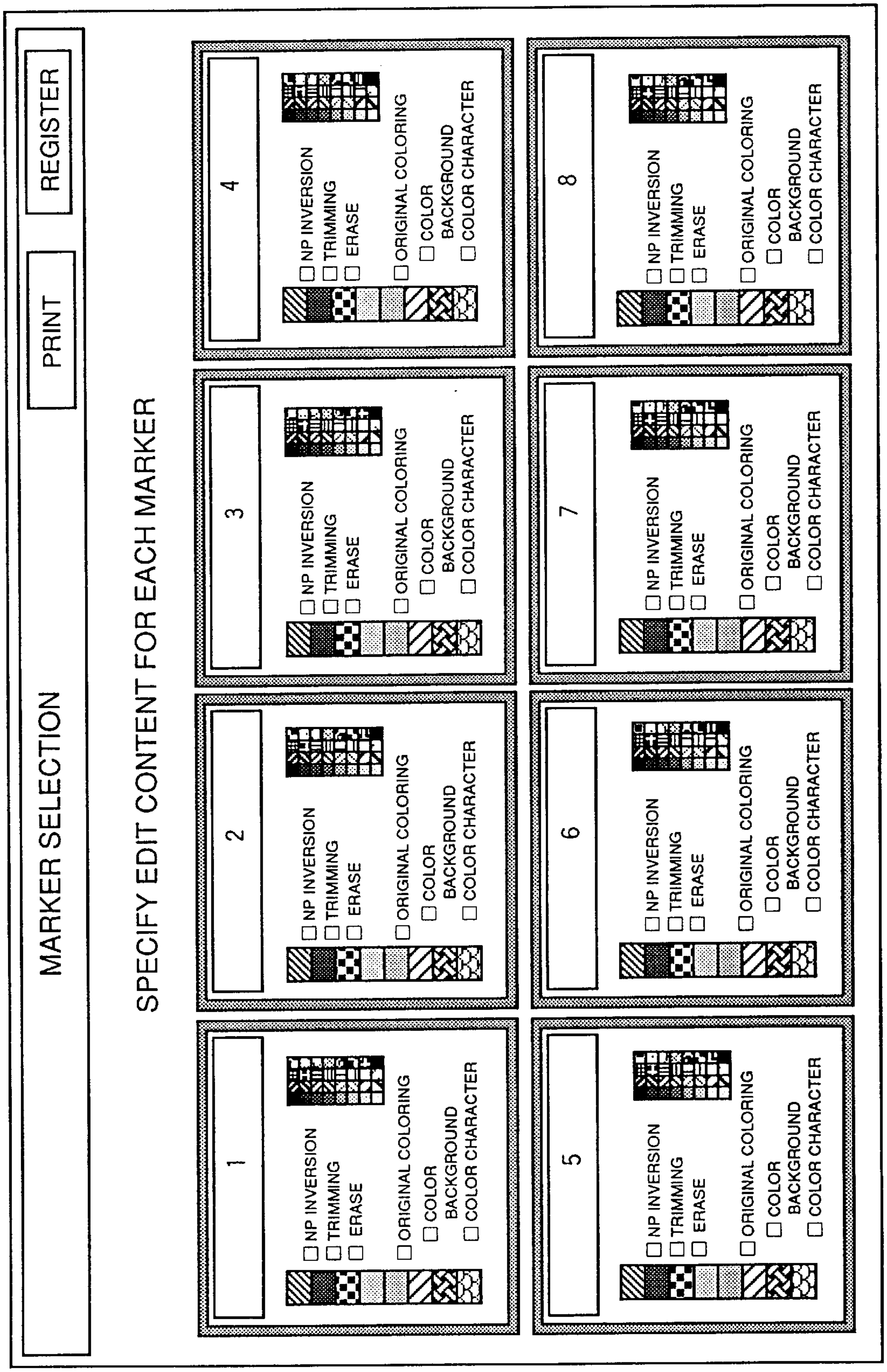
FIG. 17 illustrates a screen for specifying edit contents for markers.

FIG. 17 illustrates the screen displayed at this time. The operator can arbitrarily select combinations of the colors of the markers and the edit modes corresponding to the marker colors by operations on this screen.

Referring to FIG. 17, the operator can select desired ones of colors of markers enclosed with frames 1 to 8 and processing corresponding to the colors. In the interior of each of the frames 1 to 8, eight types of colors showing the marker colors are displayed on the left side, while four types of settable edit modes and a color pallet are displayed on the right side.

Namely, the operator selects desired ones in the frames 1 to 8, whereby the colors of the markers and the edit modes corresponding to the colors can be simply set.

When the operator selects one (e.g., red) from the colors showing the marker colors on the left side of the first frame, for example, and selects "trimming" from the edit modes on the right side of this frame, trimming is set as processing corresponding to a red marker. Similarly, specific processing corresponding to a specific marker color can be set in the second frame.

When red marker colors are selected in the respective ones of the first and second frames while "NP inversion" is selected in the first frame and "trimming" is selected in the second frame at this time, for example, the red marker color can be provided with two functions of "NP inversion" and "trimming".

When "erase" is selected in the respective ones of the first and second frames while the red marker color is selected in the first frame and a blue marker color is selected in the second frame, for example, erase processing can be implemented by either one of the red and blue marker colors.

The markers are in eight colors with eight frames, whereby at least single processing can be allocated to each marker color.

The negative/positive inversion, trimming, erase and original coloring modes settable in the marker edit mode are displayed as the edit modes, and when the original coloring mode is selected, either one of "color background" and "color character" displayed under this mode is further selected while a conversion color is specified by the displayed color pallet. Thus, the background or character part of the specified original is converted to the specified conversion color.

From the state of the screen shown in FIG. 17, the operator indicates a "print" button on the upper side of the screen with the pen, so that an image of the currently displayed screen of FIG. 17 is printed by the printer 20.

The operator can recognize the types of editing by the markers in a position separated from the copying machine 100, by observing the print output. Thus, the operator can simply color the image with the markers on a desk or the like.

Between the screen display on the color LCD 115 and an actually printed hard copy, the color tones of the markers subtly differ from each other. In general, the hard copy can display colors closer to those of the actual markers. By referring to the hard copy, therefore, the operator can recognize the relation between the colors closer to the actual marker colors and the processing corresponding to the colors.

Figure 18:
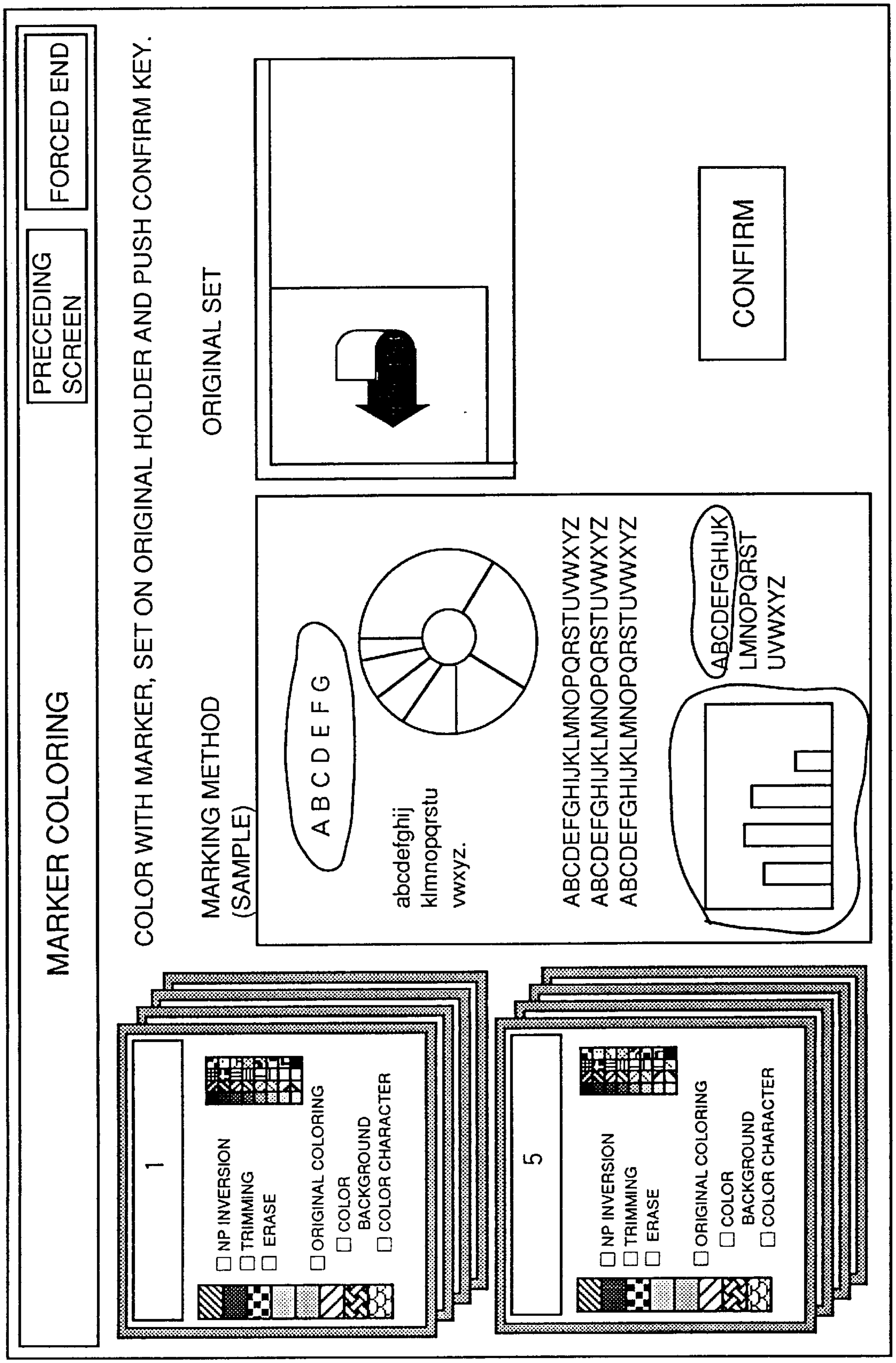
FIG. 18 illustrates a screen for reading an original colored with markers.

The colors of the markers and the edit modes are set and a "register" part on the right upper side of the screen shown in FIG. 17 is indicated with the pen, so that a screen shown in FIG. 18 is displayed on the color LCD 115.

Referring to FIG. 18, images indicating the set conditions for the respective markers specified on the precedent screen appear on the left side, an exemplary sample indicating a method of marking the originals is displayed at the center, and an image indicating a method of setting the originals on the platen 31 is displayed on the right side.

The operator indicates a "confirm" part on the lower right part of the screen with the pen, so that the image reader 30 starts reading the originals.

Referring again to FIG. 16, the ADF 200 is used to determine whether or not a marked original is set on the platen 31 at a step S101. If the determination at the step S101 is of NO, a determination is made at a step S102 as to whether or not the number of marker-specified edit areas in the original is small. If the determination at the step S102 is of NO, a determination is made at a step S103 as to whether or not the number of colors of the marker instruction is small. If the determination at the step S103 is of NO, display of the read marked original is decided at a step S104. On the basis of this decision, the original image is displayed on the color LCD 115 through the processing at the aforementioned steps S9 and S10 of FIG. 8. In this case, the original image is displayed on the color LCD 115, in order to enable addition and correction with respect to the specification with the markers. This is described in detail later.

When the ADF 200 is used (YES at the step S101), the number of the edit areas is small (YES at the step S102) or the number of marker colors is small (YES at the step S103), on the other hand, a decision of no display is made at a step S105.

When the ADF 200 is used, there is a high possibility that a large quantity of originals are copied/outputted, and the original display processing of the step S10 is not executed since copy productivity is remarkably reduced if the respective original images are displayed on the color LCD 115.

When the number of the edit areas specified with the markers or the marker colors is small, it means that the marking operation by the operator is simple. If every original is displayed and presence/absence of addition and correction is confirmed for the simple marker specification, this leads to a troublesome operation. If the number of the edit areas or the marker colors is small, therefore, the original display processing of the step S10 is not performed.

FIGS. 19 to 22 illustrate screens displayed on the color LCD 115 in the original display processing executed at the step S10. The processing at the step S10 is basically identical to that of FIG. 14 described above. In the processing of FIG. 14, each original image is displayed in a state erected with respect to the operator in response to the directions of the original and the character in the original.

Figure 19:
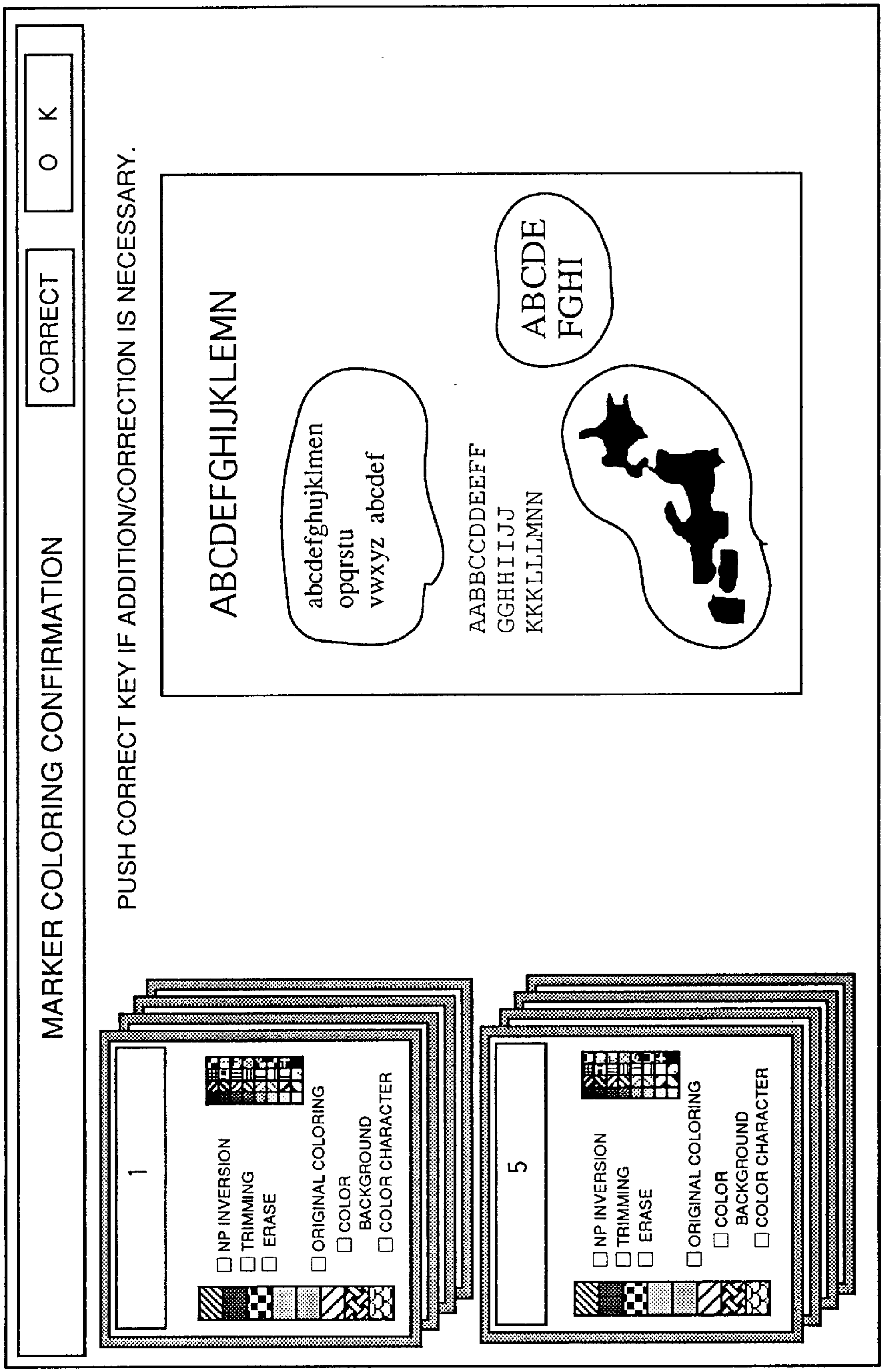
FIG. 19 illustrates a state after reading of the original from the state shown in FIG. 18.

FIG. 19 shows a screen displayed first. Referring to FIG. 19, images indicating set states of edit modes for the respective markers are displayed on the left side, and a read original is displayed on the right side.

In place of the read original image, a display after image processing indicating how the image is changed as a result of edit processing on the basis of the marker specification can be made on the right side of the screen. Due to the display of the original after this edit processing, the operator can confirm that editing by marker specification is reliably performed.

Figure 20:
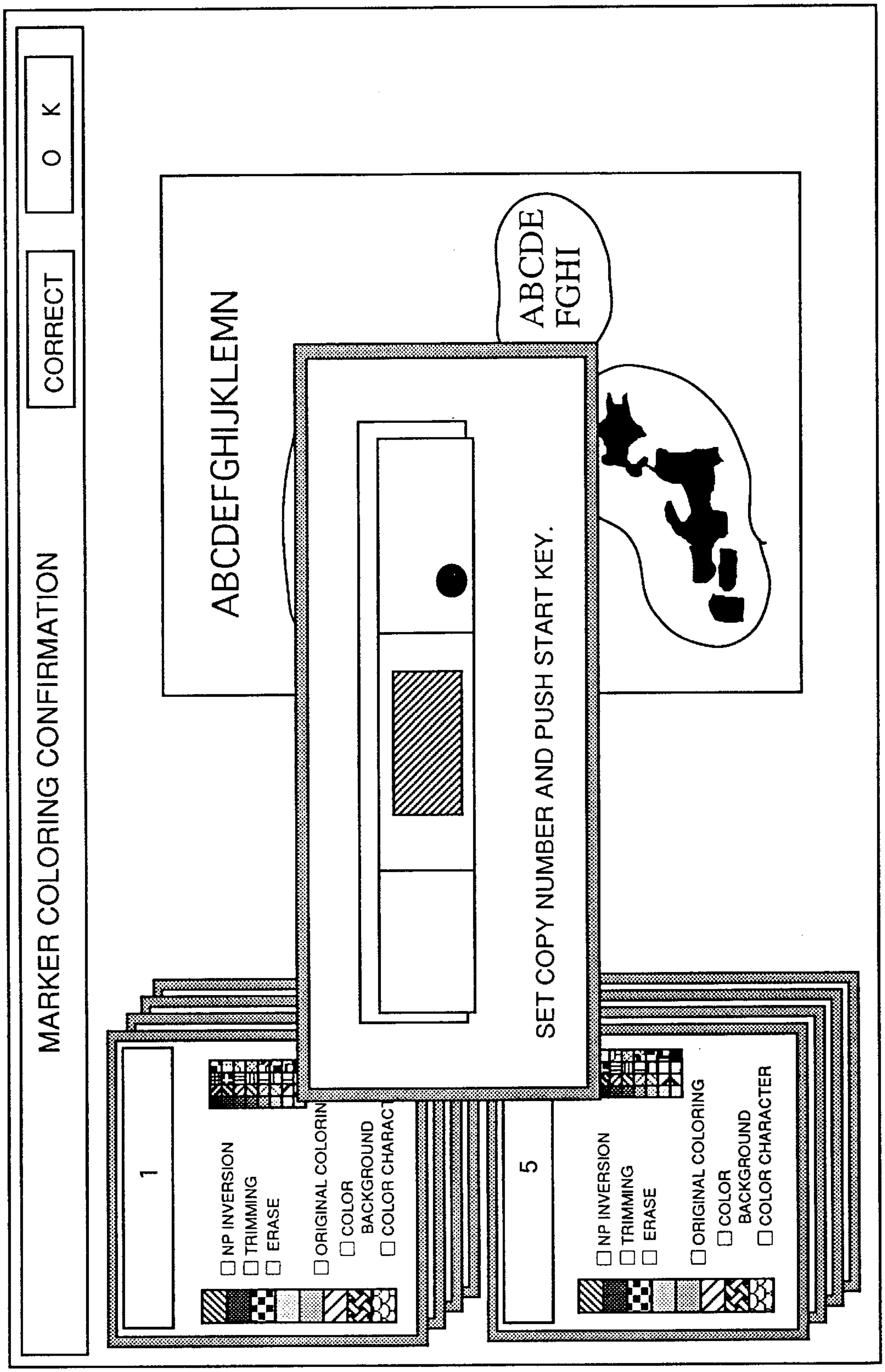
FIG. 20 shows such a state that an operator pushes down an OK part from the state shown in FIG. 19.

When the operator confirms the original image and a copy output can be made in this state, an "OK" button on the right upper part of the screen is indicated with the pen, so that a screen shown in FIG. 20 is displayed on the color LCD 115.

On the screen shown in FIG. 20, the operator inputs a copy number and pushes down the start key, so that the image reader 20 executes original reading again and copies of the original image subjected to the specified edit processing on the edit areas specified with the markers can be obtained through the processing at the steps S11 to S14 in FIG. 8.

Figure 21:
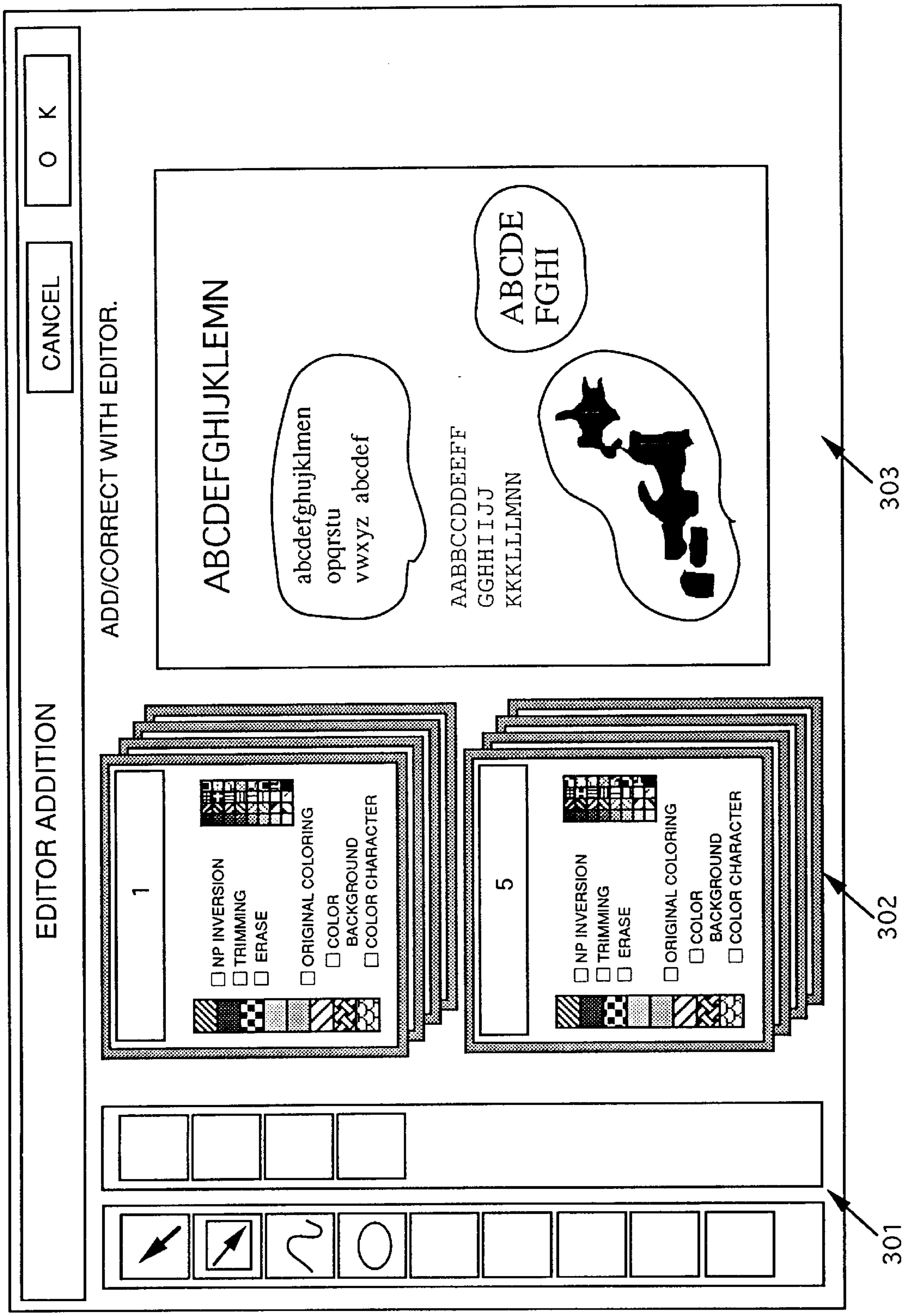
FIG. 21 illustrates an additional correction screen for a marker area with an editor.

If the operator confirms the display of the original on the screen shown in FIG. 19, finds inconvenience in its content and adds or changes instructions with markers, on the other hand, a "correction" button on the upper part of the screen is indicated with the pen, so that a screen shown in FIG. 21 is displayed on the color LCD 115.

Referring to FIG. 21, a menu pallet 301 for correcting or adding edit areas or the like through the pen-based interactive tablet 116 is displayed on the left side of the screen, a menu 302 for correcting the correspondence between the current colors of the respective markers and the edit modes is displayed at the center, and a read original image 303 is displayed on the right side. On this screen, the operator can correct or add the edit areas set with the markers, or correct the edit modes corresponding to the marker colors through the pen-based interactive tablet 116.

Figure 22:
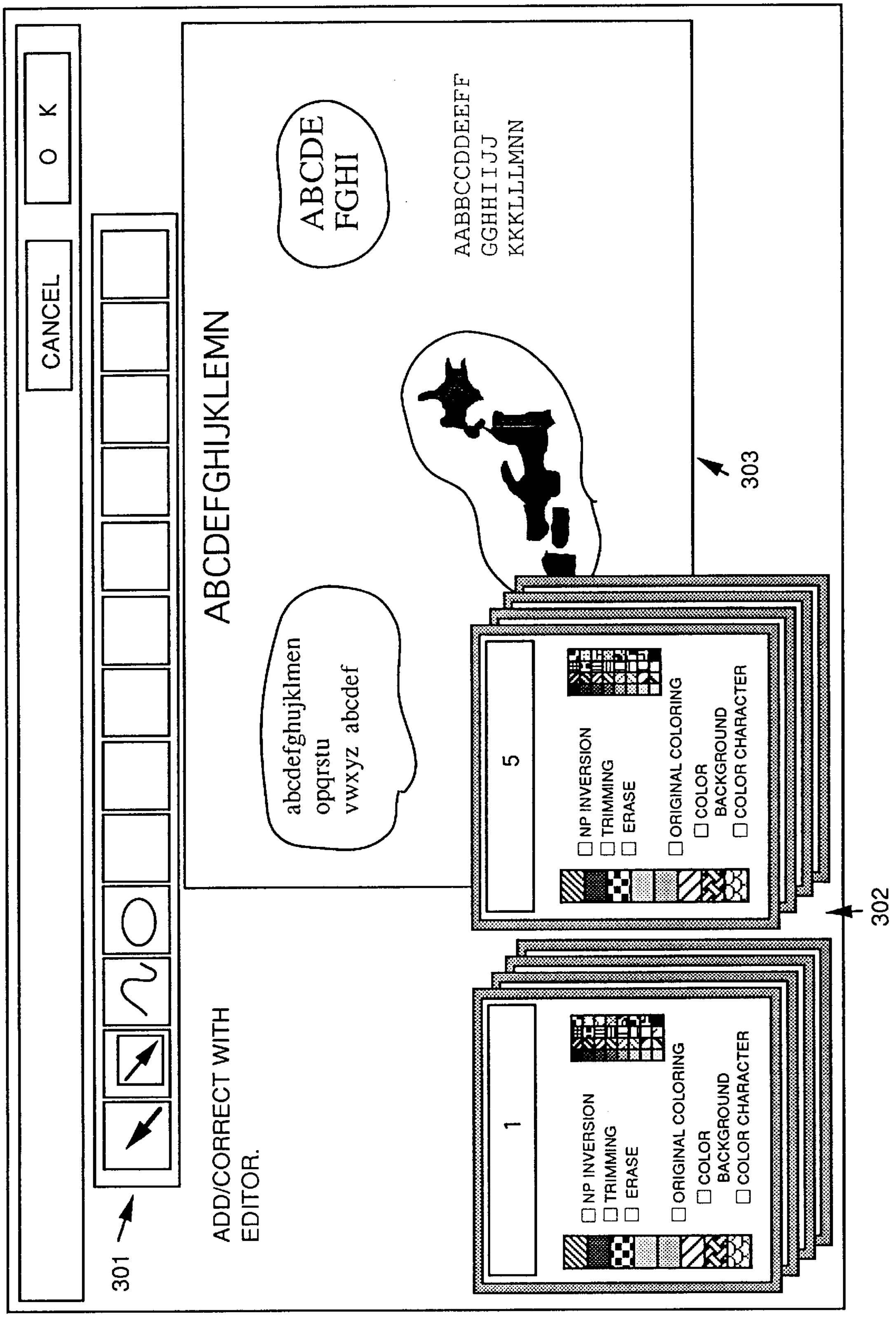
FIG. 22 illustrates an additional correction screen for a marker area with an editor in relation to a read original formed by a landscape.

If the read original shows a landscape, an original correction screen shown in FIG. 22 is outputted.

Namely, the display positions of the menu pallet 301 and the menu 302 are changed in response to whether the read original is longitudinal or transverse.

Thus, it is possible to largely display the original on the color LCD 115 by changing the positions of operation menus etc. in correspondence to the direction of the original.

The operator may manually switch whether or not the original specified with the markers is displayed on the color LCD 115.

(e) Composite Original Read Subroutine:

The composite original read subroutine shown at the step S15 of FIG. 8 is now described.

In this processing, a plurality of read original images to be composited with each other are displayed on the color LCD 115, so that the operator moves the displayed original images on the color LCD 115 through the pen-based interactive tablet 116 for compositing two images with each other. At this time, areas of the respective original images are calculated for deciding the precedence of the display on the color LCD 115 on the basis of the areas. In case of pasting a second original image which is smaller than a first original image on the first original image, for example, the destination original (first original) and the pasted original (second original) are displayed on the color LCD 115, and the image areas of these originals are calculated. In response to the relation between these areas, the destination and pasted original images are automatically determined so that the image (pasted original image) having a smaller area is displayed in preference to the image (destination original image) having a larger area, i.e., the former is displayed on the latter. In this case, it is possible to prevent such a phenomenon that the image (pasted original image) is under the image (destination original image) having a larger area and disappears from the display screen. Thus, the operator will not miss the image having a smaller area on the display screen.

Figure 23:
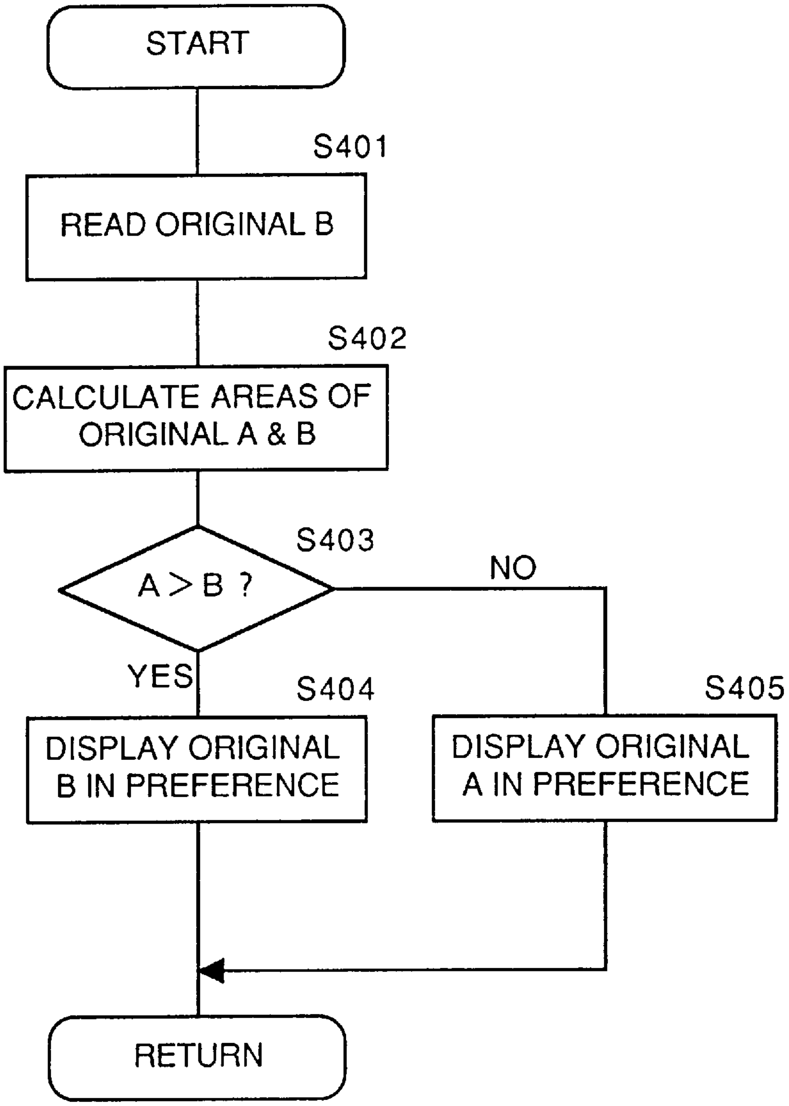
FIG. 23 is a flow chart showing processing in a composite original read routine (S15) in FIG. 8.

FIG. 23 is a flow chart showing the procedure of the composite original read subroutine. First, the image of the second original is read at a step S401, so that the read image data is stored in the composite memory 130. The second original is read at this step since the first original has already been read and stored in the original read memory 109 at the aforementioned step S1 in FIG. 8. In the following description, the original read at the step S1 of FIG. 8 is referred to as an original A, and the second original is referred to as an original B.

At a step S402, the areas of the original images A and B are calculated. At a step S403, a determination is made as to whether or not the area of the original A is larger than that of the original image B. If the determination at the step S403 is of YES, the original image B is displayed on the color LCD 115 in preference at a step S404. If the determination at the step S403 is of NO, on the other hand, the original image A is displayed on the color LCD 115 in preference at a step S405.

Figure 24:
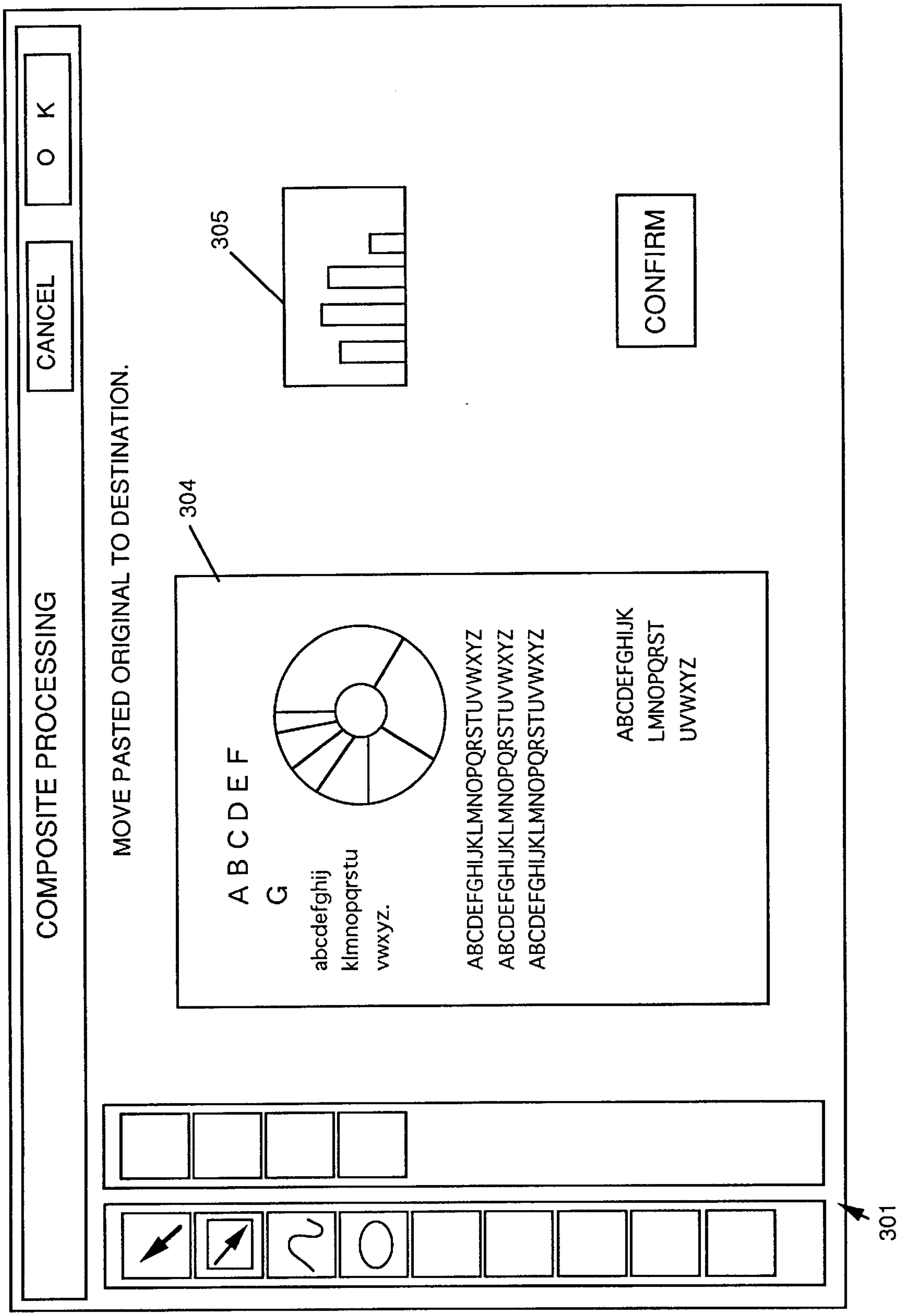
FIG. 24 illustrates a screen for compositing originals with each other.

The processing at the steps S404 and S405 is described in more detail. FIG. 24 shows original images 304 and 305 which are displayed on the color LCD 115 in the composite mode.

In this state, the operator can move the respective ones of the displayed original images 304 and 305 by an edit operation with the pen or the like.

Figure 25:
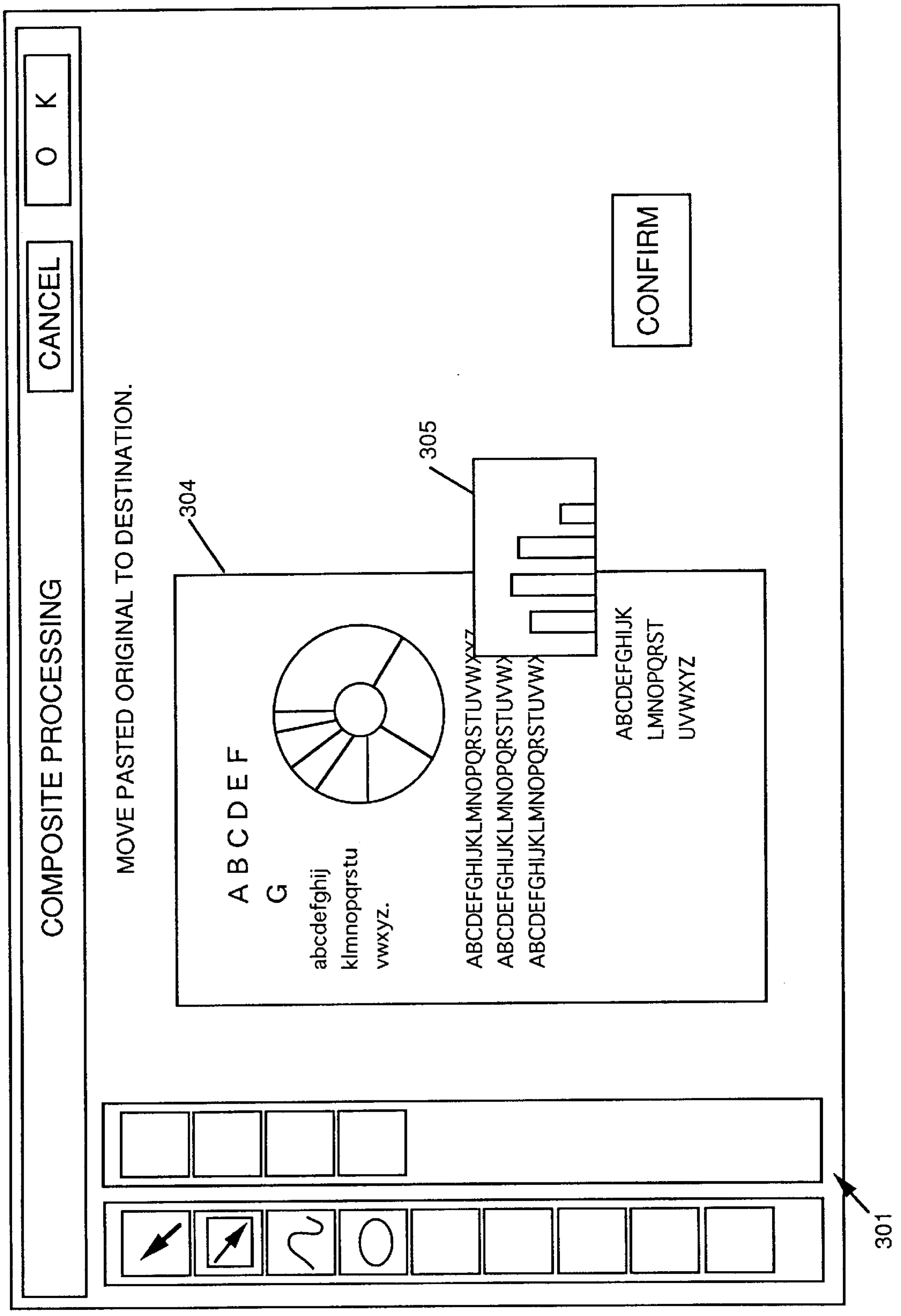
FIG. 25 illustrates an original 305 moved onto an original 304 from the state shown in FIG. 24.

When the operator moves the original image 305 having a smaller area displaying a bar graph onto the original image 304 having a larger area from the state shown in FIG. 24 by an edit operation and overlaps the two original images 304 and 305 with each other, the original image 305 having a smaller area is determined as that to be pasted, and displayed in preference to the original image 304, i.e., overlapped on the original image 304 (FIG. 25). The operator moves the original image on the color LCD 115 in the aforementioned manner, and pastes the same on a desired arbitrary position.

While the original image 305 having a smaller area is moved and pasted in the above description, the original image 304 having a larger area may alternatively be moved for pasting. Also in this case, the original image 305 having a smaller area is displayed in preference on the screen.

When the pasting is completed on the screen, the operator pushes down the "OK" button on the right upper part of the screen with the pen. Thus, the image data are read from the composite image memory 130 and the original read memory 109 in the processing at the step S16 in FIG. 8, the read image data are composited with each other to be in the same relation as the images composited on the color LCD 115, and printing is executed on the basis of the image data composited at the step S17, so that a composite image is printed out.

While image composition for pasting overall areas of the read original images has been described in the above, it is also possible to block-define parts of the read original images with the menu pallet 301 shown in FIG. 24 for compositing specified edit areas of the original images with each other. In this case, the areas of the edit areas of the specified originals are compared with each other so that the precedence of the display is decided on the basis of the result of the comparison.

Figure 26:
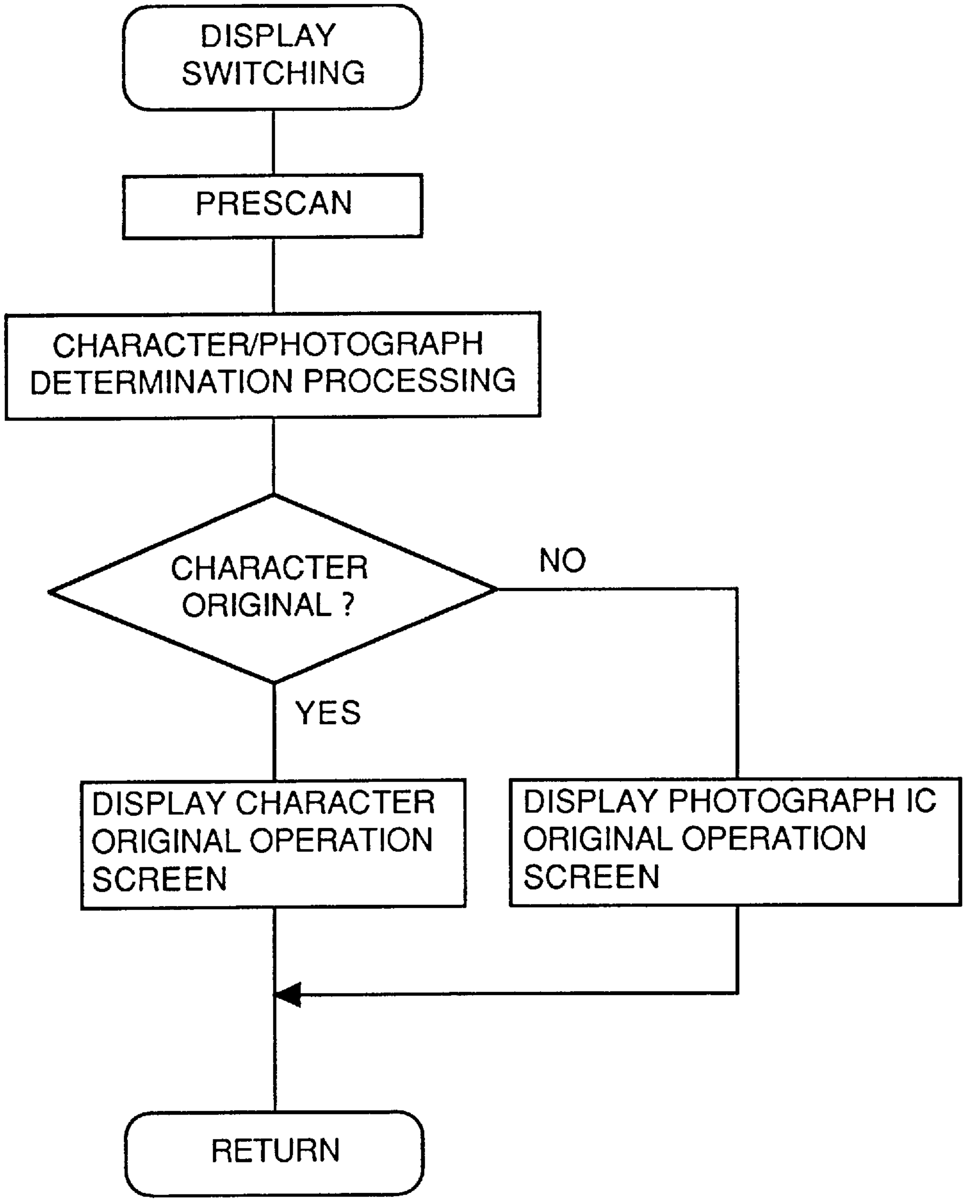
FIG. 26 illustrates a modification of the flow chart shown in FIG. 9.

7. Modifications (a) Modification of Display Switching Subroutine:

It is possible to modify the display switching subroutine shown in FIG. 9 to that shown in FIG. 26. While a determination is made on a colored or monochromatic original for switching the screen display for selecting the image edit mode in FIG. 9, a determination is alternatively made on a character or photographic image for switching screen display in FIG. 26. The term "character image" indicates an image consisting of black and white and including no mid-tone image, and the term "photographic image" indicates an image having gradation.

The edit mode selectable in response to the image is also changed in response to the type of the determined image. For example, underline editing of underlining a specified desired position, halftone editing of overlapping a halftone image on a desired character string or the like is prepared as the image edit mode for a character original, while a sepia copy mode for converting the tone of an original image to a sepia image is prepared as the image edit mode for a photographic original.

Figure 27:
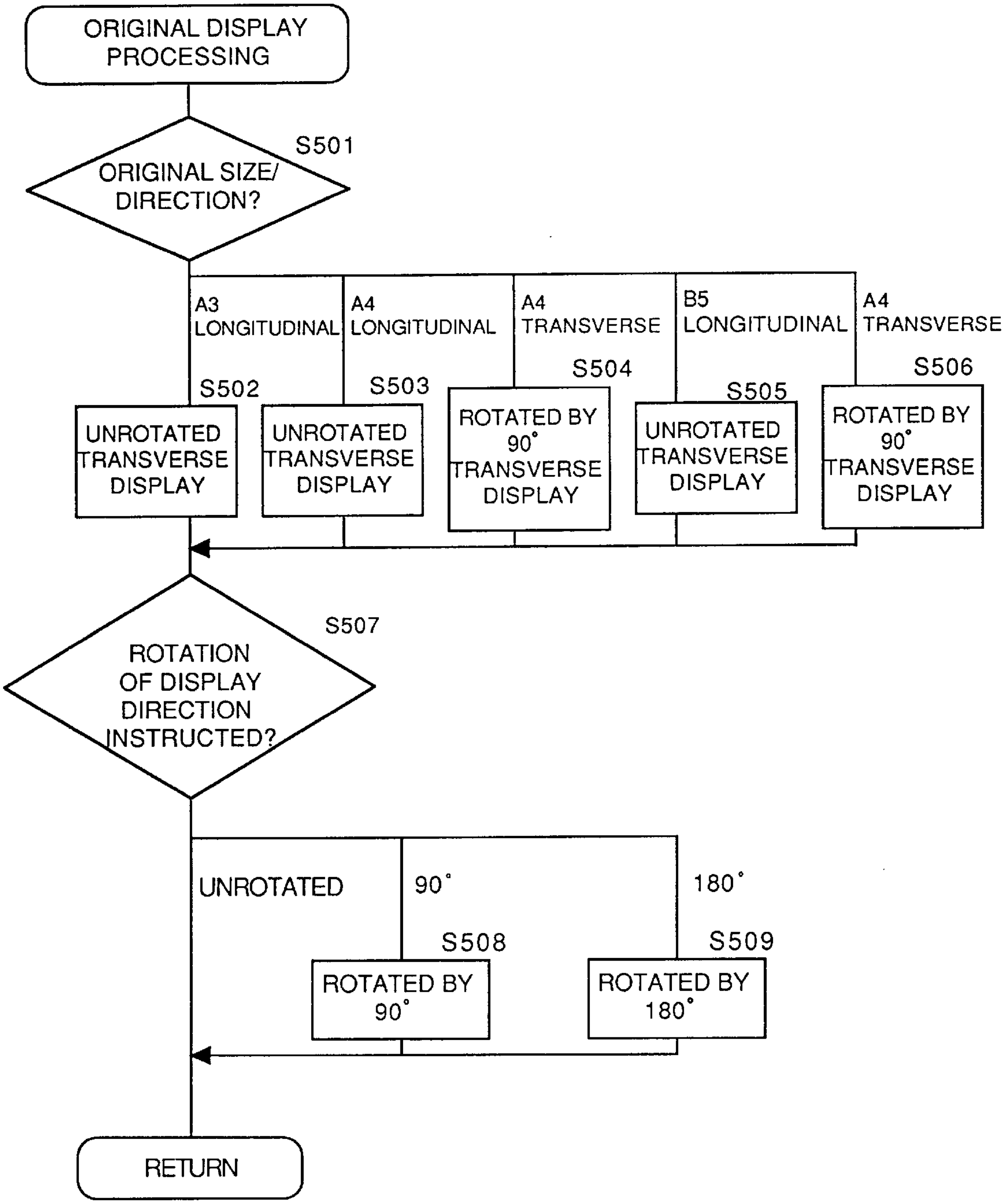
FIG. 27 illustrates a modification of the flow chart shown in FIG. 14.

(b) Modification of Original Display Processing Subroutine:

It is possible to modify the original display processing subroutine shown in FIG. 14 to that shown in FIG. 27. Referring to FIG. 27, the size and the direction of a read original are determined at a step S501, so that the original image is regularly transversely displayed on the color LCD 115 in processing at steps S502 to S506 in response to the determined direction of the original. Therefore, a portrait original is displayed in an inclined state with respect to the operator. However, the display screen of the color LCD 115 which is transverse can be effectively used by transversely displaying the original image, whereby the original image can be largely displayed. Then, a determination is made at a step S507 as to whether or not the operator instructs rotation of the image, and the original image is rotated at a step S508 or S509 on the color LCD 115 in response to the instructed angle of rotation. Thus, the operator can change the display of the original image, inclined in the processing at the steps S502 and S503, in an erected state at need.

The operator's instruction determined at the step S507 is made by an input from the pen-based interactive tablet 116.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device comprising:

read means for reading an original image and generating image data;

display means for displaying a plurality of screens for selecting a desired image edit mode from a plurality of image edit modes, each of said screens having image edit modes which are different between each screens;

determination means for determining the type of said original image read by said read means;

display control means for selecting a screen among said plurality of screens in response to the type determined by said determination means and causing said display means to display said selected screen; and image edit means for performing image processing on said image data outputted from said read means in response to an image edit mode selected through said selected screen displayed on said display means.

2. The image processing device in accordance with claim 1, wherein said determination means determines whether said image is a colored image or a monochromatic image.

3. The image processing device in accordance with claim 1, wherein said determination means determines whether said image is a photographic image or a character image.

4. An image processing device comprising:

read means for reading an original and outputting image data;

determination means for determining an orientation of said original document read by said read means;

rotation means for rotating said image data outputted from said read means on the basis of the direction of said original determined by said determination means; and display means for displaying an original image on the basis of said image data rotated by said rotation means.

5. The image processing device in accordance with claim 4, wherein said determination means further determines the direction of a character in said original image.

6. The image processing device in accordance with claim 5, wherein said rotation means rotates said image data to correctly erect said character in said original image displayed on said display means with respect to an operator in response to the direction of said character determined by said determination means.

7. The image processing device in accordance with claim 5, wherein said determination means determines the direction of a character in said original image.

8. The image processing device in accordance with claim 4, wherein said display means displays an input screen for editing said original image along with said displayed original image, the display position of said input screen being changed in response to the direction of said displayed original image.

9. The image processing device of claim 4, wherein the determination means determines whether the original document is in a portrait mode or a landscape mode.

* * * * *